United States Patent
Wang et al.

(10) Patent No.: US 12,399,894 B2
(45) Date of Patent: Aug. 26, 2025

(54) METHOD AND APPARATUS FOR DETECTING SCHEDULING DEADLOCK IN DATA QUERY, AND DEVICE

(71) Applicant: Beijing Volcano Engine Technology Co., Ltd., Beijing (CN)

(72) Inventors: Tao Wang, Beijing (CN); Tao Meng, Beijing (CN); Haitao Xu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/889,114

(22) Filed: Sep. 18, 2024

(65) Prior Publication Data
US 2025/0124028 A1   Apr. 17, 2025

(30) Foreign Application Priority Data
Oct. 12, 2023   (CN) .......................... 202311322425.X

(51) Int. Cl.
*G06F 16/24*   (2019.01)
*G06F 16/2453*   (2019.01)

(52) U.S. Cl.
CPC .. *G06F 16/24537* (2019.01); *G06F 16/24542* (2019.01)

(58) Field of Classification Search
None
See application file for complete search history.

(56) References Cited

U.S. PATENT DOCUMENTS

| 2002/0138353 A1 | 9/2002 | Schreiber et al. |
| 2006/0080285 A1* | 4/2006 | Chowdhuri ....... G06F 16/24532 |
| 2008/0147599 A1* | 6/2008 | Young-Lai ........ G06F 16/24532 |

(Continued)

FOREIGN PATENT DOCUMENTS

| CN | 109299133 A | 2/2019 |
| CN | 111125444 A | 5/2020 |

(Continued)

OTHER PUBLICATIONS

China National Intellectual Property Administration, Notice of Allowance Issued in Application No. 202311322425.X, May 16, 2025, 10 pages.

*Primary Examiner* — Augustine K. Obisesan
(74) *Attorney, Agent, or Firm* — Alleman Hall & Tuttle LLP

(57) ABSTRACT

Discloses are a method for detecting a scheduling deadlock in data query. A query plan tree generated by a query statement includes a common temporary table production operator node, a common temporary table consumption operator node, and a hash join operator node. At least one right table chain in the tree is determined. Operator nodes in the right table chain are traversed from bottom to top starting from the leaf node in the right table chain, and the other operator nodes in the tree are traversed, to analyze an execution order relationship between the operator nodes traversed in the tree. When it is found based on the execution order relationship that there are two identical common temporary table consumption operator nodes in the tree that have scheduling dependency, and their upstream operators are the same common temporary table production operator, it is determined that there is a scheduling deadlock.

20 Claims, 6 Drawing Sheets

(56) References Cited

U.S. PATENT DOCUMENTS

2009/0271385 A1* 10/2009 Krishnamoorthy ........................ G06F 16/24532
 707/999.005
2014/0310258 A1* 10/2014 Tian .................... G06F 16/2471
 707/718
2018/0089270 A1* 3/2018 Qiu ................... G06F 16/24542
2020/0201860 A1* 6/2020 Vogelsgesang ... G06F 16/24537

FOREIGN PATENT DOCUMENTS

| CN | 111858075 | A |   | 10/2020 | |
|----|-----------|---|---|---------|---|
| CN | 114647674 | A | * | 6/2022  | |
| CN | 115794426 | A |   | 3/2023  | |
| CN | 116775124 | A |   | 9/2023  | |
| CN | 117271580 | A | * | 12/2023 | |
| JP | 7079898   | B2 | * | 6/2022 | ....... G06F 16/24537 |

* cited by examiner

METHOD AND APPARATUS FOR DETECTING SCHEDULING DEADLOCK IN DATA QUERY, AND DEVICE

CROSS-REFERENCE TO RELATED APPLICATION(S)

This application claims priority to Chinese Application No. 202311322425. X filed Oct. 12, 2023, the disclosure of which is incorporated herein by reference in its entirety.

FIELD

The present application relates to the field of computer technologies, and in particular, to a method and apparatus for detecting a scheduling deadlock in data query, and a device.

BACKGROUND

A common table expression (CTE) is a commonly used Structured Query Language syntax used to define a common temporary table in a query. A query process is generally built as a pipeline. It allows for scheduling from top to bottom and execution from bottom to top.

A hash join is a multi-table operation method used to join two tables. When both the CTE and the hash join are used in the pipeline of the query process, there may be a scheduling deadlock, causing a query failure. Currently, there is an urgent need for a scheduling deadlock detection method to detect whether there is a scheduling deadlock in a query process.

SUMMARY

In view of this, the present application provides a method and apparatus for detecting a scheduling deadlock in data query, and a device, which can accurately detect whether there is a scheduling deadlock in a query process.

In order to solve the above technical problem, technical solutions provided by the present application are as follows.

According to a first aspect, the present application provides a method for detecting a scheduling deadlock in data query. The method includes:

obtaining a query statement, and generating a query plan tree corresponding to the query statement, the query plan tree including a plurality of operator nodes and a query logical relationship between the plurality of operator nodes, and the operator nodes including a common temporary table production operator node, a common temporary table consumption operator node, and a hash join operator node;

traversing the query plan tree to determine at least one right table chain in the query plan tree, the right table chain including a leaf node and a root node that is not the hash join operator node in the query plan tree, where when a parent node of an operator node in the right table chain is the hash join operator node, the operator node is a right child node of its parent node, and the right table chain includes the parent node of the operator node;

traversing the operator nodes in the right table chain from bottom to top starting from the leaf node in the right table chain, and traversing the other operator nodes in the query plan tree, to analyze an execution order relationship between the operator nodes traversed in the query plan tree, and searching for two identical common temporary table consumption operator nodes in the query plan tree that have a scheduling dependency relationship, the scheduling dependency relationship representing different execution orders of the two identical common temporary table consumption operator nodes; and determining that there is a scheduling deadlock when upstream operator nodes of the two identical common temporary table consumption operator nodes that have the scheduling dependency relationship are the same common temporary table production operator node.

According to a second aspect, the present application provides an apparatus for detecting a scheduling deadlock in data query. The apparatus includes:

a generation unit configured to obtain a query statement, and generate a query plan tree corresponding to the query statement, the query plan tree including a plurality of operator nodes and a query logical relationship between the plurality of operator nodes, and the operator nodes including a common temporary table production operator node, a common temporary table consumption operator node, and a hash join operator node;

a first determining unit configured to traverse the query plan tree to determine at least one right table chain in the query plan tree, the right table chain including a leaf node and a root node that is not the hash join operator node in the query plan tree, where when a parent node of an operator node in the right table chain is the hash join operator node, the operator node is a right child node of its parent node, and the right table chain includes the parent node of the operator node;

a searching unit configured to traverse the operator nodes in the right table chain from bottom to top starting from the leaf node in the right table chain, and traverse the other operator nodes in the query plan tree, to analyze an execution order relationship between the operator nodes traversed in the query plan tree, and search for two identical common temporary table consumption operator nodes in the query plan tree that have a scheduling dependency relationship, the scheduling dependency relationship representing different execution orders of the two identical common temporary table consumption operator nodes; and a second determining unit configured to determine that there is a scheduling deadlock when upstream operator nodes of the two identical common temporary table consumption operator nodes that have the scheduling dependency relationship are the same common temporary table production operator node.

According to a third aspect, the present application provides an electronic device. The electronic device includes:

one or more processors; and a storage apparatus having one or more programs stored thereon, where the one or more programs, when executed by the one or more processors, cause the one or more processors to implement the method for detecting a scheduling deadlock in data query according to any one of the above.

According to a fourth aspect, the present application provides a computer-readable storage medium having stored thereon a computer program that, when executed by a processor, implements the method for detecting a scheduling deadlock in data query according to any one of the above.

It can be seen that the present application has the following benefits:

The present application provides the method and apparatus for detecting a scheduling deadlock in data query, and the device. The query statement is first obtained, and the query plan tree corresponding to the query statement is generated. The query plan tree includes the plurality of operator nodes and the query logical relationship between the plurality of operator nodes. The operator nodes include the common temporary table production operator node, the common temporary table consumption operator node, and the hash join operator node. Then, there may be a scheduling deadlock in the query plan tree. Based on this, the query plan tree is traversed to determine at least one right table chain in the query plan tree. The right table chain includes the leaf node and the hash join operator node in the query plan tree. When the parent node of the operator node in the right table chain is the hash join operator node, the operator node is the right child node of its parent node, and the right table chain includes the parent node of the operator node. When the root node of the query plan tree is not the hash join operator node, the right table chain includes the root node. It can be learned that the right table chain includes the hash join operator node and the right child node of the hash join operator node. Therefore, when there is a scheduling deadlock in the query plan tree, it is usually caused by scheduling dependency of a chain other than the right table chain in the query plan tree on a right sub-chain of the hash join operator node in the right table chain. Specifically, the scheduling dependency is caused by a common temporary table production operator node in the chain other than the right table chain in the query plan tree on the same common temporary table production operator node in the right sub-chain of the hash join operator node in the right table chain.

Therefore, each right table chain is used as a traversal basis in the present application. The operator nodes in the right table chain are traversed from bottom to top starting from the leaf node in the right table chain, and the other operator nodes of the query plan tree are traversed, to analyze the execution order relationship between the operator nodes traversed in the query plan tree. The execution order relationship can be further used to analyze whether there is scheduling dependency between two identical common temporary table consumption operator nodes in the query plan tree. In this way, the two identical common temporary table consumption operator nodes in the query plan tree that have the scheduling dependency relationship are found, and it is determined that there is a scheduling deadlock when the upstream operator nodes of the two identical common temporary table consumption operator nodes that have the scheduling dependency relationship are the same common temporary table production operator node. Therefore, whether there is a scheduling deadlock in the query plan tree can be accurately determined, and the common temporary table consumption operator nodes and the common temporary table production operator node that cause the scheduling deadlock can also be accurately determined.

DETAILED DESCRIPTION OF EMBODIMENTS

To make the above objectives, features, and advantages of the present application more apparent and comprehensible, embodiments of the present application are further described below in detail with reference to the accompanying drawings and specific implementations.

In order to facilitate understanding and explanation of technical solutions provided in the embodiments of the present application, the BACKGROUND of the embodiments of the present application is described first below.

A common table expression (CTE) is a commonly used Structured Query Language (SQL) syntax used to define a common temporary table used in a query process. Within a query engine, the common temporary table is usually generated uniformly and then output to various locations where the common temporary table is to be used, to reduce repeated calculations and reuse the common temporary table. In the embodiments of the present application, a location where the common temporary table is generated may be called a CTE Producer, and a location where the common temporary table is used may be called a CTE Consumer. The same CTE Producer generated may be reused across a plurality of CTE Consumers.

A hash join is a multi-table operation mode used to join two tables, which is briefly referred to as a join in the embodiments of the present application. In a query process, the hash join may be used to perform a multi-table operation. The hash join is an important operator of the query engine. An execution method of the hash join includes a hash table build phase and a hash table probe phase. Two tables operated by the hash join may be called a left table and a right table. In the hash table build phase, right table data is read to build a hash table, and left table data is not processed at this time. In the hash table probe phase, each piece of data in the left table is read, and related data in the hash table is probed and output.

The query process is generally built as a pipeline (also known as a query plan tree). The query process includes a scheduling process and an execution process. The scheduling process is top-down scheduling (from top to bottom starting from a root node of the query plan tree), and the execution process is bottom-up execution (from bottom to top starting from a leaf node of the query plan tree). When an upstream operator in the pipeline starts executing, a downstream operator needs to process an intermediate result from the upstream operator in time to avoid a buffer being exhausted. Both the CTE and the hash join may be used in the pipeline of the query process, which may cause a scheduling deadlock in the query process and lead to a query failure.

Figure 1A:
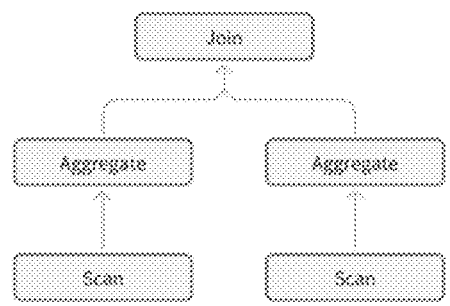
FIG. 1A and FIG. 1B are schematic diagrams of two query plan trees according to an embodiment of the present application.
Figure 1B:
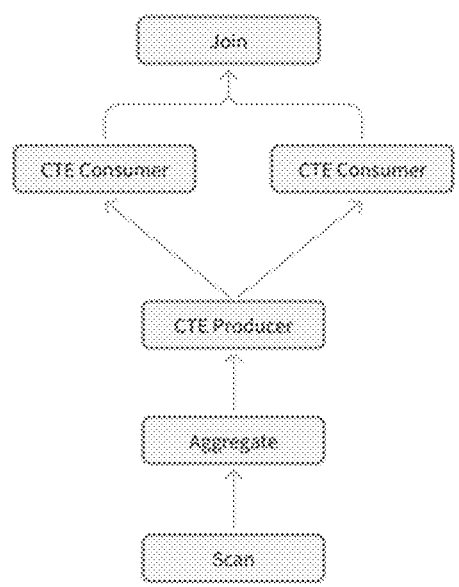

Referring to FIG. 1A and FIG. 1B, FIG. 1A and FIG. 1B are schematic diagrams of two query plan trees according to an embodiment of the present application. FIG. 1A shows a CTE inline execution mode of the query engine when both the CTE and the hash join are present in the query plan tree. As shown in FIG. 1A, Scan represents a scanning operator and Aggregate represents an aggregation operator. In the CTE inline execution mode, a CTE Consumer operator may be added after each aggregation operator. Common temporary tables obtained by various CTE Consumer operators are not produced and transferred by the same CTE Producer operator. Therefore, each CTE Consumer operator performs execution independently. It can be seen that in the CTE inline execution mode, an execution plan maintains a simple tree structure, which can achieve more thorough query optimization (such as predicate pushdown) and easier scheduling execution.

FIG. 1B shows a CTE shared execution mode of the query engine when both the CTE and the hash join are present in the query plan tree. As shown in FIG. 1B, common temporary tables obtained by two CTE Consumer operators are produced and transferred by the same CTE Consumer operator. In other words, in the CTE shared execution mode, the CTE Producer is executed uniformly and then outputs the common temporary table to the two CTE Consumers for use. It can be seen that the CTE shared execution mode can avoid repeated calculations of data in the common temporary tables. When the common temporary tables have high calculation costs, query performance can be significantly optimized.

For example, if a query needs to be made to obtain the growth of a total order amount, a query plan tree may be constructed for this query. Then, the query on the growth of the total order amount is completed based on the query plan tree. Specifically, the constructed query plan tree may be shown in FIG. 1B. Result data joined in the query plan tree is growth data of the total order amount. Result data obtained by the left CTE Consumer through the common temporary table is a total order amount for a specific day last year, and result data obtained by the right CTE Consumer through the common temporary table is a total order amount for the same day this year. A JOIN operation can join the result data obtained by the left CTE Consumer and the result data obtained by the right CTE Consumer, and then obtain the growth data of the total order amount for the same day this year compared to the total order amount for the specific day last year (that is, the total order amount for the same day this year minus the total order amount for the specific day last year). Data used by the left CTE Consumer and the right CTE Consumer includes a total order amount for each day of each year. Therefore, the common temporary table may be built by the same CTE Producer, and the common temporary table may be transferred to the left CTE Consumer and the right CTE Consumer. Data in the common temporary table is the total order amount for each day of each year.

For example, the common temporary tables obtained by the left CTE Consumer and the right CTE Consumer are identical. For example, a total order amount of 1 million for Aug. 1, 2023 is recorded in the first row of the common temporary table, and a total order amount of 0.5 million for Aug. 1, 2022 is recorded in the second row. Then, the result data obtained by the left CTE Consumer through the common temporary table may be the data in the second row of the common temporary table, and the result data obtained by the right CTE Consumer through the common temporary table may be the data in the first row of the common temporary table. After the JOIN operation, the total order amount of 1 million for Aug. 1, 2023 and the total order amount of 0.5 million for Aug. 1, 2022 can be reflected in the same row. Therefore, the growth data of the total order amount can be calculated.

However, there may be a scheduling deadlock in the query plan tree in the CTE shared execution mode. As shown in FIG. 1B, when the two tables operated by the hash join are two identical CTE Consumer operators and the common temporary tables used by the two CTE Consumer operators are from the same CTE Producer, it indicates that the common temporary tables from the two identical CTE Consumer operators are identical and are both produced by the same CTE Producer. Moreover, the common temporary table in the same CTE Consumer is both the left table and the right table in the hash join operation.

Based on this, since the query plan tree is executed from bottom to top during scheduling in the query process, and the right table data is first executed in the hash join operation (hash table build phase), the right table data is first read in the hash join operation, that is, the data in the common temporary table in the right CTE Consumer operator. Then, at this time, calculations of the CTE Producer is driven downward to produce the common temporary table to be transferred to the right CTE Consumer operator. However, since the same CTE Producer is used, the common temporary table produced by the CTE Producer is output to the left CTE Consumer at the same time, and then the left CTE Consumer operator also receives the common temporary table transferred by the CTE Producer. However, at this time, the hash join is still in the hash table build phase, and the data received by the left CTE Consumer cannot be processed, thus causing the scheduling deadlock. It can be learned that the scheduling deadlock occurs during the execution of the query plan tree. Due to the scheduling deadlock, the data in the common temporary table may accumulate in a buffer in the left CTE Consumer, and may eventually exceed a cache limit of the buffer, causing the buffer to be exhausted, thus leading to a query failure.

In practical applications, there may be a scheduling deadlock in the query process implemented based on TPC-H and TPC-DS. In conclusion, there is an urgent need for a scheduling deadlock detection method to detect whether there is a scheduling deadlock in a query process.

In view of this, the embodiments of the present application provide a method and apparatus for detecting a scheduling deadlock in data query, and a device. A query statement is first obtained, and a query plan tree corresponding to the query statement is generated. The query plan tree includes a plurality of operator nodes and a query logical relationship between the plurality of operator nodes. The operator nodes include a common temporary table production operator node, a common temporary table consumption operator node, and a hash join operator node. Then, there may be a scheduling deadlock in the query plan tree. Based on this, the query plan tree is traversed to determine at least one right table chain in the query plan tree. The right table chain includes a leaf node and a hash join operator node in the query plan tree. When a parent node of an operator node in the right table chain is the hash join operator node, the operator node is a right child node of its parent node, and the right table chain includes the parent node of the operator node. When a root node of the query plan tree is not the hash join operator node, the right table chain includes the root node. Each right table chain is used as a traversal basis. The operator nodes in the right table chain are traversed from bottom to top starting from the leaf node in the right table chain, and the other operator nodes in the query plan tree are traversed, to analyze the execution order relationship between the operator nodes traversed in the query plan tree. The execution order relationship can be further used to analyze whether there is scheduling dependency between two identical common temporary table consumption operator nodes in the query plan tree. In this way, two identical common temporary table consumption operator nodes in the query plan tree that have a scheduling dependency relationship are found, and it is determined that there is a scheduling deadlock when upstream operator nodes of the two identical common temporary table consumption operator nodes that have the scheduling dependency relationship are the same common temporary table production operator node. Therefore, whether there is a scheduling deadlock in the query plan tree can be accurately determined, and common temporary table consumption operator nodes and a common temporary table production operator node that cause the scheduling deadlock can also be accurately determined.

It can be understood that the defects in the above solutions are obtained by the applicant after practice and thorough research. Therefore, both the process of discovering the above-mentioned problems and the solutions proposed in the embodiments of the present application for the above-mentioned problems below should be contributions made by the applicant to the embodiments of the present application during the application process.

To facilitate understanding of the present application, the method for detecting a scheduling deadlock in data query provided in an embodiment of the present application is described below with reference to the accompanying drawings. The method may be applied to a terminal device and/or a server, which is not limited here. The terminal device includes but is not limited to a smartphone, a tablet computer, a notebook computer, a smart watch, etc. The server may be an independent physical server, a server cluster consisting of a plurality of physical servers, or a distributed system, or a cloud server that provides basic cloud computing services such as cloud services, cloud databases, cloud computing, cloud storage, big data, and artificial intelligence platforms.

Figure 2:
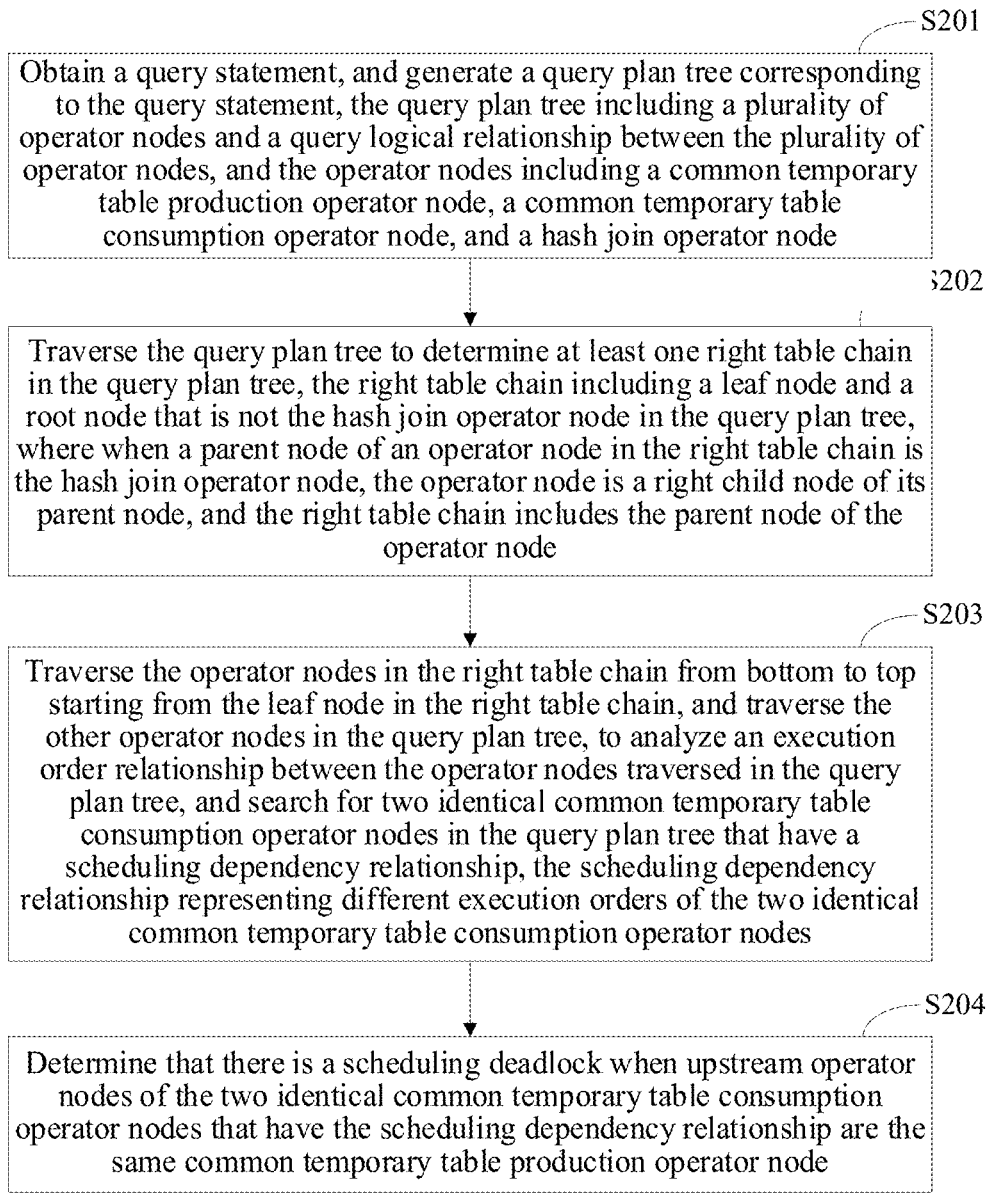
FIG. 2 is a flowchart of a method for detecting a scheduling deadlock in data query according to an exemplary embodiment of the present application.

Reference is made to FIG. 2, which is a flowchart of the method for detecting a scheduling deadlock in data query according to this embodiment of the present application. As shown in FIG. 2, the method may include S201 to S204.

S201: Obtain a query statement, and generate a query plan tree corresponding to the query statement. The query plan tree includes a plurality of operator nodes and a query logical relationship between the plurality of operator nodes. The operator nodes include a common temporary table production operator node, a common temporary table consumption operator node, and a hash join operator node.

The query statement is used to perform data query, and the query statement may be a statement of Structured Query Language (SQL), which is not limited here. Further, the query engine may construct the corresponding query plan tree based on the query statement. The query plan tree may be considered as an execution plan formulated to implement the data query. A scheduling process for the query plan tree is top-down, but an execution process is bottom-up. For example, a result of the query plan tree is that A can be obtained. However, A is obtained based on B and C, and both B and C are obtained based on D, that is, top-down scheduling. During execution, D needs to be obtained first, then B and C are obtained based on D, and then A is obtained, that is, bottom-up execution.

The query plan tree is of a tree structure, including the plurality of operators and the query logical relationship (also known as a pipeline relationship) between the plurality of operator nodes. The plurality of operators may be represented hierarchically, as shown in FIG. 1B. A layer-1 operator is a bottom-most operator, an input of a layer-2 operator depends on an output of the layer-1 operator, an input of a layer-3 operator depends on an output of the layer-2 operator, an input of a layer-4 operator depends on an output of the layer-3 operator, and a layer-5 operator is a top-most operator. The layer-1 operator is a Scan operator, the layer-2 operator is an Aggregate operator, the layer-3 operator is a CTE Producer operator, the layer-4 operators are two identical CTE Consumer operators, and the layer-5 operator is a Join operator. The Scan operator has a direct flow relationship toward the Aggregate operator, the Aggregate operator has a direct flow relationship toward the CTE Producer operator, the CTE Producer operator has a direct flow relationship toward each of the two identical CTE Consumer operators, and the two identical CTE Consumer operators have a direct flow relationship toward the Join operator. In other words, an input of a downstream operator (upper-layer operator) depends on an output of an adjacent upstream operator (lower-layer operator) that has a direct flow relationship toward the downstream operator.

It can be learned from the above analysis process that the scheduling deadlock occurs in the query plan tree where there are the common temporary table production operator node, the common temporary table consumption operator node, and the hash join operator node. Therefore, the query plan tree in this step includes at least a common temporary table production operator node (a CTE Producer operator), a common temporary table consumption operator node (a CTE Consumer operator), and a hash join operator node (a hash join operator), to detect whether there may be a scheduling deadlock during execution of the query plan tree. The common temporary table production operator node is used to generate a common temporary table to be transferred to the common temporary table consumption operator node.

S202: Traverse the query plan tree to determine at least one right table chain in the query plan tree, the right table chain including a leaf node and a root node that is not the hash join operator node in the query plan tree. When a parent node of an operator node in the right table chain is the hash join operator node, the operator node is a right child node of its parent node, and the right table chain includes the parent node of the operator node.

In this embodiment of the present application, to detect a scheduling deadlock, the query plan tree is first traversed to determine the at least one right table chain in the query plan tree. The right table chain meets the following conditions: The right table chain includes a leaf node and a hash join operator node in the query plan tree. When a parent node of an operator node in the right table chain is the hash join operator node, the operator node is a right child node of its parent node, and the right table chain includes the parent node of the operator node (that is, the hash join operator node). When a root node of the query plan tree is not the hash join operator node, the right table chain includes the root node.

The applicant has found through research that the scheduling deadlock occurs when a left table of the hash join operator has a dependency relationship on the right table. The dependency relationship may be reflected as an order relationship in which the right table needs to be executed first and then the left table. However, the order relationship between the left table and the right table conflicts with a feature of the CTE Producer operator that it outputs a plurality of tables to identical CTE Consumer operators at a time, such that when the CTE Producer operator generates a common temporary table, in addition to the right CTE Consumer operator under the hash join operator receiving the common temporary table, the left CTE Consumer operator under the hash join operator can also receive the common temporary table and produce data. However, the data cannot be processed by the hash join operator, thereby causing the scheduling deadlock.

Therefore, there is a need to search for operators having a dependency relationship in the query plan tree. However, the right table chain includes the hash join operator node and the right child node of the hash join operator node. Therefore, when there is a scheduling deadlock in the query plan tree, it is usually caused by scheduling dependency of a chain other than the right table chain in the query plan tree on a right sub-chain of the hash join operator node in the right table chain. Specifically, the scheduling dependency is caused by a common temporary table production operator node in the chain other than the right table chain in the query plan tree on the same common temporary table production operator node in the right sub-chain of the hash join operator node in the right table chain. A right sub-chain of a node is a chain between the node and a right child node of the node and a sub-chain of the right child node of the node. In addition, the right table chain includes a leaf node. When there are a plurality of leaf nodes, subsequent steps can be performed for a plurality of right table chains to avoid missing the scheduling deadlock in the query plan tree as much as possible.

In a possible implementation, this embodiment of the present application provides a specific implementation for traversing the query plan tree to determine the at least one right table chain in the query plan tree. The specific implementation includes the following steps.

A1: Assign a first flag to a root node of the query plan tree.

The query plan tree is traversed starting from the root node of the query plan tree, and the first flag is assigned to the root node. The first flag may be a first value, such as a Boolean value, for example, true. It can be understood that this is only an example here and does not constitute a limitation. For example, the first flag may alternatively be a flag other than a Boolean value.

A2: Traverse the operator nodes in the query plan tree from top to bottom starting from the root node, and if the operator node traversed is the hash join operator node, assign the first flag to a right child node of the hash join operator node, and assign a second flag to a left child node of the hash join operator node; or if the operator node traversed is not the hash join operator node, assign a value of the operator node traversed to both the left child node and the right child node of the operator node, until reaching the leaf node of the query plan tree.

After the first flag is assigned to the root node, the operator nodes in the query plan tree are traversed from top to bottom starting from the root node. In the traversing process, assignment rules are followed. The assignment rules distinguish an operator node traversed as a hash join operator node or not the hash join operator node.

In other words, if the operator node traversed is the hash join operator node, the first flag (for example, true) is assigned to a right child node of the hash join operator node, and the second flag is assigned to a left child node of the hash join operator node. As an optional example, when the first flag is true, the second flag may be a second value, such as another Boolean value, for example, false. In addition, if the operator node traversed is not the hash join operator node, a value of the operator node traversed is assigned to both the left child node and the right child node of the operator node.

The operator nodes in the query plan tree are traversed from top to bottom starting from the root node, and each operator node in the query plan tree is assigned a value according to the assignment rules of the operator nodes, until reaching the leaf node of the query plan tree.

A3: Traverse operator nodes with the first flag in the query plan tree from bottom to top starting from the leaf node with the first flag, until reaching an operator node with the second flag, and determine a chain formed by the operator nodes traversed as the right table chain in the query plan tree.

It can be understood that if an operator node has a plurality of parent nodes, the operator node may have a plurality of flags, for example, including both the first flag and the second flag. When the right table chain in the query plan tree is determined, if an operator node is assigned both the first flag and the second flag, the main focus is on the first flag (for example, true) of the operator node.

In practical applications, the leaf node may have a plurality of parent nodes. The leaf node is usually assigned both the first flag and the second flag. In this step, the main focus is on the first flag of the leaf node.

After each operator node in the query plan tree is assigned a flag, the right table chain in the query plan tree starts to be determined. Specifically, operator nodes with the first flag in the query plan tree are traversed from bottom to top starting from the leaf node with the first flag, until reaching an operator node with the second flag, and a chain formed by the operator nodes traversed is determined as the right table chain in the query plan tree.

It can be learned that a number of right table chains in the query plan tree is equal to a number of leaf nodes with the first flag in the query plan tree.

To facilitate understanding of A1 to A3, the process of A1 to A3 is described below with reference to the accompanying drawings. Referring to FIG. 3A to FIG. 3E, FIG. 3A to FIG. 3E are schematic diagrams of query plan trees with a scheduling deadlock according to an embodiment of the present application. The right table chain in the query plan tree is determined using the five query plan trees shown in FIG. 3A to FIG. 3E as examples.

Figure 3A:
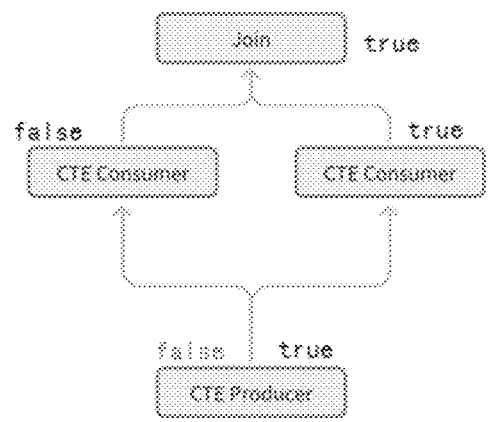
FIG. 3A to FIG. 3E are schematic diagrams of query plan trees with a scheduling deadlock according to an embodiment of the present application.

As shown in FIG. 3A, an operator node first traversed is a Join node as a root node, then true is assigned to the root node of the query plan tree. Since the Join node is the hash join operator node, true is assigned to a right child node of the hash join operator node (that is, the right CTE Consumer), and false is assigned to a left child node of the hash join operator node (that is, the left CTE Consumer). The right CTE Consumer and the left CTE Consumer have the same CTE Producer. Further, the operator nodes in the query plan tree are traversed from top to bottom. The left CTE Consumer operator node is not the hash join operator node, and both a left child node and a right child node thereof are the CTE Producer operator, then the same value false is assigned to the child nodes of the left CTE Consumer operator node (that is, the CTE Producer). The right CTE Consumer operator node is not the hash join operator node, and both a left child node and a right child node thereof are the CTE Producer operator, then the same value true is assigned to the child nodes of the right CTE Consumer operator node (that is, the CTE Producer). In this way, the leaf node of the query plan tree is reached.

At this moment, the only leaf node that is true is the CTE Producer operator node. In this case, the operator nodes that are true in the query plan tree are traversed from bottom to top starting from the CTE Producer operator node until reaching an operator node that is false. Then, the operator nodes traversed include the CTE Producer operator node, the right CTE Consumer operator node, and the Join operator node. Then, there is only one right table chain in the query plan tree shown in FIG. 3A, namely Join-right CTE Consumer-CTE Producer (a flow relationship is from the CTE Producer to the right CTE Consumer, and from the right CTE Consumer to the Join, which is a bottom-up flow relationship).

Figure 3B:
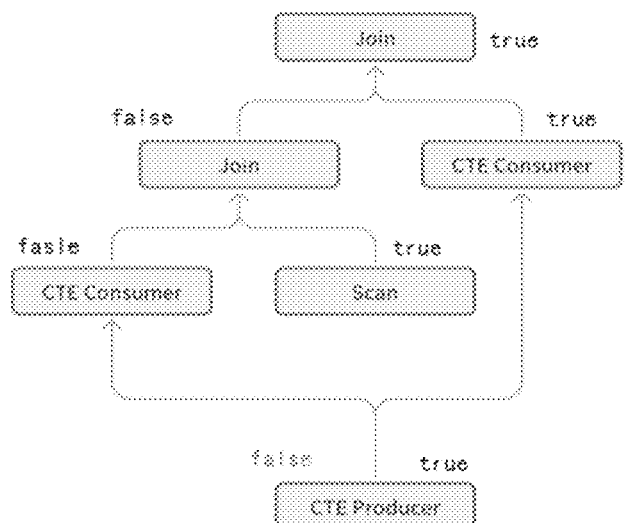

As shown in FIG. 3B, an operator node first traversed is a Join node as a root node (the layer-4 operator node), then true is assigned to the root node of the query plan tree. Since the Join node is the hash join operator node, true is assigned to a right child node of the hash join operator node (that is, the layer-3 CTE Consumer), and false is assigned to a left child node of the hash join operator node (that is, the layer-3 Join). Further, the operator nodes in the query plan tree are traversed from top to bottom. The layer-3 Join is the hash join operator node, then true is assigned to a right child node of the layer-3 Join (that is, the layer-2 Scan), and false is assigned to a left child node of the hash join operator node (that is, the layer-2 CTE Consumer). In addition, the layer-3 CTE Consumer is not the hash join operator node, then the same value true is assigned to both left and right child nodes of the layer-3 CTE Consumer (that is, the CTE Producer). Further, the layer-2 CTE Consumer is also not the hash join operator node, then the same value false is assigned to both left and right child nodes of the layer-2 CTE Consumer (that is, the CTE Producer). The layer-3 CTE Consumer and the layer-2 CTE Consumer have the same CTE Producer. In this way, the leaf node of the query plan tree is reached.

At this time, the leaf nodes that are true are the Scan operator node and the CTE Producer operator node. In this case, the operator nodes that are true in the query plan tree are traversed from bottom to top starting from each of the Scan operator node and the CTE Producer operator node, until reaching an operator node that is false. Specifically, the operator nodes traversed from bottom to top starting from the Scan operator node include the Scan operator node and the layer-3 Join operator node, and a right table chain represented by them is layer-3 Join-Scan (a flow relationship is from Scan to the layer-3 Join). The operator nodes traversed from bottom to top starting from the CTE Producer operator node include the CTE Producer operator node, the layer-3 CTE Consumer operator node, and the layer-4 Join operator node, and a right table chain represented by them is layer-4 Join-layer-3 CTE Consumer-CTE Producer (a flow relationship is from the CTE Producer to the layer-3 CTE Consumer, and from the layer-3 CTE Consumer to the layer-4 Join). Therefore, there are two right table chains in the query plan tree shown in FIG. 3B.

Figure 3C:
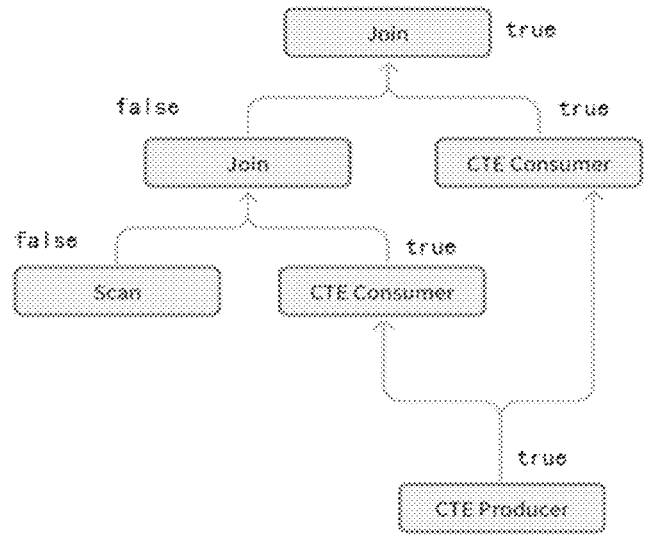

As shown in FIG. 3C, compared to FIG. 3B, the Scan operator node in FIG. 3C is false, and the layer-2 CTE Consumer operator node is true. Based on this, under the layer-2 CTE Consumer operator node, the CTE Producer operator node is true. Under the layer-3 CTE Consumer operator node, the CTE Producer operator node is also true.

Then, in FIG. 3C, the only leaf node that is true is the CTE Producer operator node. In this case, the operator nodes traversed from bottom to top starting from the CTE Producer operator node include the CTE Producer operator node, the layer-2 CTE Consumer operator node, and the layer-3 Join operator node, and a right table chain represented by them is layer-3 Join-layer-2 CTE Consumer-CTE Producer (a flow relationship is from the CTE Producer to the layer-2 CTE Consumer, and from the layer-2 CTE Consumer to the layer-3 Join). In addition, the operator nodes traversed from bottom to top starting from the CTE Producer operator node may also include the CTE Producer operator node, the layer-3 CTE Consumer operator node, and the layer-4 Join operator node, and a right table chain represented by them is layer-4 Join-layer-3 CTE Consumer-CTE Producer (a flow relationship is from the CTE Producer to the layer-3 CTE Consumer, and from the layer-3 CTE Consumer to the layer-4 Join). The layer-3 CTE Consumer and the layer-2 CTE Consumer have the same CTE Producer. Therefore, there are two right table chains in the query plan tree shown in FIG. 3C.

Figure 3D:
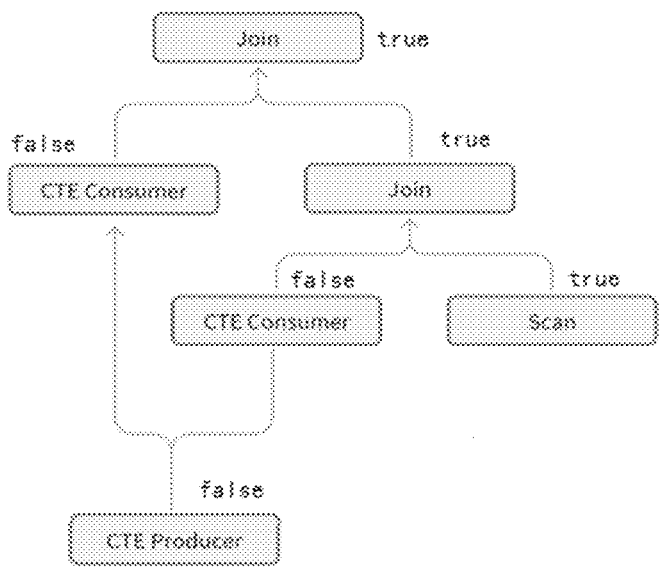

As shown in FIG. 3D, an operator node first traversed is a Join node as a root node (the layer-4 Join operator node), then true is assigned to the root node of the query plan tree. Since the layer-4 Join node is the hash join operator node, true is assigned to a right child node of the hash join operator node (that is, the layer-3 Join operator node), and false is assigned to a left child node of the hash join operator node (that is, the layer-3 CTE Consumer). Further, the operator nodes in the query plan tree are traversed from top to bottom. The layer-3 Join is the hash join operator node, then true is assigned to a right child node of the layer-3 Join (that is, the layer-2 Scan), and false is assigned to a left child node of the hash join operator node (that is, the layer-2 CTE Consumer). In addition, the layer-3 CTE Consumer is not the hash join operator node, then the same value false is assigned to both left and right child nodes of the layer-3 CTE Consumer (that is, the CTE Producer). Further, the layer-2 CTE Consumer is also not the hash join operator node, then the same value false is assigned to both left and right child nodes of the layer-2 CTE Consumer (that is, the CTE Producer). Finally, the CTE Producer has only a value of false. The layer-3 CTE Consumer and the layer-2 CTE Consumer have the same CTE Producer. In this way, the leaf node of the query plan tree is reached.

At this time, the leaf node that is true is the Scan operator node. In this case, the operator nodes that are true in the query plan tree are traversed from bottom to top starting from the Scan operator node, until reaching an operator node that is false. Specifically, the operator nodes traversed from bottom to top starting from the Scan operator node include the Scan operator node, the layer-3 Join operator node, and the layer-4 Join operator node, and a right table chain represented by them is layer-4 Join-layer-3 Join-Scan (a flow relationship is from Scan to the layer-3 Join, and from the layer-3 Join to the layer-4 Join). Therefore, there is one right table chain in the query plan tree shown in FIG. 3B.

It can be learned that the layer-3 CTE Consumer and the layer-2 CTE Consumer in FIG. 3B to FIG. 3D are the same CTE Producer, that is, the two identical CTE Consumers under the nested Join operator nodes (for example, the layer-3 Join operator node and the layer-4 Join operator node are nested) use the same CTE Producer (that is, upstream operators are the same CTE Producer).

Figure 3E:
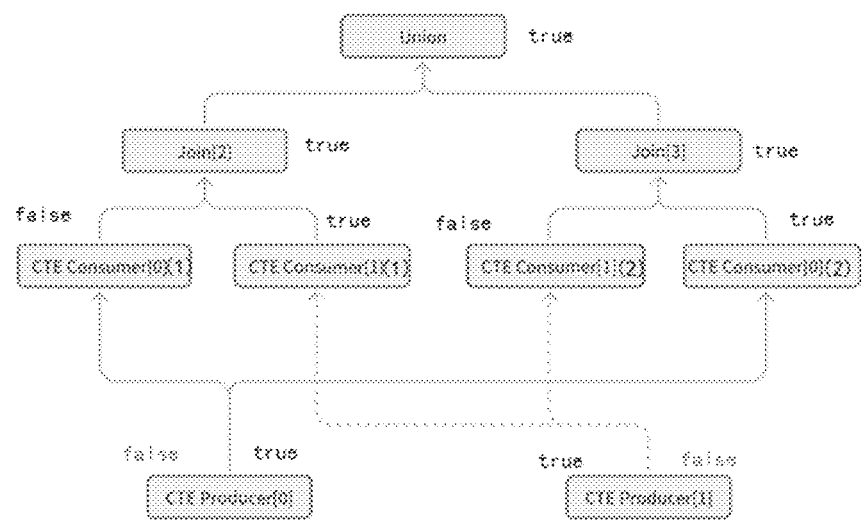

As shown in FIG. 3E, an operator node first traversed is a Union operator node as a root node, then true is assigned to the root node of the query plan tree. Since the Union node is not the hash join operator node, true is assigned to left and right child nodes of the hash join operator node, that is, both Join[2] and Join[3] are true. Further, the operator nodes in the query plan tree are traversed from top to bottom. Since both Join[2] and Join[3] are hash join operator nodes, true is assigned to a right child node of Join[2](that is, CTE Consumer[1](1)), and false is assigned to a left child node of Join[2](that is, CTE Consumer[0](1)). Similarly for Join[3], true is assigned to a right child node of Join[3](that is, CTE Consumer[0](2)), and false is assigned to a left child node of Join[3](that is, CTE Consumer[1](2)). The CTE Consumer[0](1) and the CTE Consumer[0](2) are two identical CTE Consumer operator nodes, and use the same CTE Producer [0]. In addition, the CTE Consumer[1](1) and the Consumer[1](2) are two identical CTE Consumer operator nodes, and use the same CTE Producer [1].

Then, CTE Consumer[0](1), CTE Consumer[0](2), CTE Consumer[1](1), Consumer[1](2), etc. are all not the hash join operator node, then both left and right child nodes of each of the nodes that is not the hash join operator node are assigned the same Boolean value as the node that is not the hash join operator node. In this way, the leaf node of the query plan tree is reached.

The leaf nodes CTE Producer [0] and CTE Producer [1] of the query plan tree respectively correspond to two Boolean values, namely true and false. At this time, the leaf nodes that are true are the CTE Producer [0] and the CTE Producer [1], then the operator nodes that are true in the query plan tree are traversed from bottom to top starting from each of the CTE Producer [0] and the CTE Producer [1], until reaching an operator node that is false. Specifically, the operator nodes traversed from bottom to top starting from CTE Producer [0] include CTE Producer [0], CTE Consumer[0](2), Join[3], and Union, and a right table chain represented by them is Union-Join[3]-CTE Consumer[0](2)-CTE Producer [0](a flow relationship is from CTE Producer [0] to CTE Consumer[0](2), from CTE Consumer[0](2) to Join[3], and from Join[3] to Union). The operator nodes traversed from bottom to top starting from CTE Producer [1] include CTE Producer [1], CTE Consumer[1](1), Join[2], and Union, and a right table chain represented by them is Union-Join[2]-CTE Consumer[1](1)-CTE Producer [1](a flow relationship is from CTE Producer [1] to CTE Consumer[1](1), from CTE Consumer[1](1) to Join[2], and from Join[2] to Union). Therefore, there are two right table chains in the query plan tree shown in FIG. 3E.

It can be learned that Union in FIG. 3E is a merge operator, which is used to merge data of two or more streams into one stream. Child nodes under Union are executed in parallel, that is, Join[2] and Join[3] are executed in parallel. Identical CTE Consumers in the Join[2] and the Join[3] that are executed in parallel use the same CTE Producer. For example, the CTE Consumer[0](1) under the Join[2] and the CTE Consumer[0](2) under the Join[3] use the same CTE Producer [0].

S203: Traverse the operator nodes in the right table chain from bottom to top starting from the leaf node in the right table chain, and traverse the other operator nodes in the query plan tree, to analyze an execution order relationship between the operator nodes traversed in the query plan tree, and search for two identical common temporary table consumption operator nodes in the query plan tree that have a scheduling dependency relationship, the scheduling dependency relationship representing different execution orders of the two identical common temporary table consumption operator nodes.

After the right table chain in the query plan tree is determined, two identical common temporary table production operator nodes with a scheduling dependency relationship in the query plan tree can be found based on the right table chain, to determine, based on this, whether there is a scheduling deadlock in the query plan tree. Specifically, since the query plan tree reflects the flow relationship between the operator nodes (reflects the execution order between the operator nodes), the execution order relationship between the operator nodes in the query plan tree can be analyzed. For example, the execution order of the CTE Producer operator node in FIG. 3A is the earliest.

During specific implementation, the operator nodes in the right table chain are traversed from bottom to top starting from the leaf node in the right table chain, and the other operator nodes in the query plan tree are traversed, to analyze the execution order relationship between the operator nodes traversed. In this way, due to the scheduling dependency may be produced by a common temporary table production operator node in the chain other than the right table chain in the query plan tree on the same common temporary table production operator node in the right subchain of the hash join operator node in the right table chain, the operator nodes in the query plan tree are traversed using the method above, which can conveniently learn, by analysis, the execution order relationship between the operator nodes traversed.

After the execution order relationship between the operator nodes traversed is determined, the two identical common temporary table consumption operator nodes in the query plan tree that have the scheduling dependency relationship are found based on the execution order relationship between the operator nodes traversed, that is, the two identical common temporary table consumption operator nodes that have different execution orders are found.

It can be understood that, when there are a plurality of right table chains, each right table chain needs to be traversed, and during the process of traversing the operator nodes in each right table chain, the other operator nodes in the query plan tree are traversed, to analyze the execution order relationship between the operator nodes traversed. In other words, step S203 needs to be performed for each right table chain. However, the execution order relationships obtained by analysis do not affect each other, and are all used to search for the two identical common temporary table consumption operator nodes in the query plan tree that have the scheduling dependency relationship.

In a possible implementation, this embodiment of the present application provides a specific implementation for S203 of traversing the operator nodes in the right table chain from bottom to top starting from the leaf node in the right table chain, and traversing the other operator nodes in the query plan tree, to analyze an execution order relationship between the operator nodes traversed in the query plan tree. The specific implementation includes the following steps.

B1: Determine the leaf node in the right table chain as a node with the earliest execution order.

Since the execution process of the query plan tree is execution from bottom to top, the leaf node of the query plan tree is the node with the earliest execution order. Based on this, after the right table chain is determined, the leaf node in the right table chain is determined as the node with the earliest execution order.

For example, the execution order of the CTE Producer operator node in the right table chain in FIG. 3A is the earliest.

B2: Traverse the operator nodes in the right table chain from bottom to top starting from the leaf node in the right table chain, and determine an execution order relationship between the operator nodes in the right table chain according to order rules; and traverse the other operator nodes of the query plan tree, and determine an execution order relationship between the other operator nodes according to the order rules.

In this step, the operator nodes in the right table chain are traversed from bottom to top starting from the leaf node in the right table chain, and during the process of traversing the operator nodes in the right table chain, the other operator nodes in the query plan tree are further traversed. During the traversing process, the execution order relationship between the operator nodes traversed is determined according to the order rules.

As an optional example, the order rules include one or more of the following:

when a downstream operator node is not the hash join operator node, determining that execution orders of an adjacent upstream operator node and the downstream operator node are the same; and when there is the hash join operator node, determining that an execution order of the hash join operator node is later than an execution order of a right child node of the hash join operator node, and is the same as an execution order of a left child node of the hash join operator node.

It can be understood that since the scheduling deadlock in the query plan tree is related to the Join operator node and the CTE Consumer under the Join operator node, the focus in step B2 of this embodiment of the present application is on the execution order relationship between the Join operator node and its adjacent left and right child nodes. Therefore, it is determined that the execution order of the Join operator node is later than the execution order of the right child node of the Join operator node, and the execution order of the Join operator node is the same as the execution order of the left child node of the Join operator node, thereby reflecting the execution method of the hash join operator node and the execution order. In other words, in the execution method of the hash join operator node, the execution order of the hash table build phase (reflected by the execution order of the right child node of the Join operator node) is earlier than the hash table probe phase (reflected by the execution order of the left child node of the Join operator node).

When a downstream operator node is not the Join operator node, it indicates that its adjacent upstream operator node may be a Join operator node or not the Join operator node. The execution orders of upstream and downstream operator nodes that are adjacent and both not Join, or upstream and downstream operator nodes of which the upstream operator node is a Join operator node but an adjacent downstream operator node is not the Join operator node are determined to be the same, ignoring the order of their execution.

In this way, the two identical common temporary table consumption operator nodes in the query plan tree that have the scheduling dependency relationship can be conveniently found based on the setting of the above order rules.

In actual applications, during the process of traversing the operator nodes in the right table chain from bottom to top starting from the leaf node in the right table chain, and traversing the other operator nodes in the query plan tree, order values may be assigned to the operator nodes traversed, to reflect the execution order relationship between the operator nodes through the order values.

Further, two identical common temporary table consumption operator nodes with different order values in the query plan tree may be determined as the two identical common temporary table consumption operator nodes in the query plan tree that have the scheduling dependency relationship. The different order values represent different execution orders, and there is a scheduling dependency relationship between the two identical common temporary table consumption operator nodes.

During specific implementation, this embodiment of the present application provides a specific implementation for traversing the operator nodes in the right table chain from bottom to top starting from the leaf node in the right table chain, traversing the other operator nodes in the query plan tree, and assigning order values to the operator nodes traversed. The specific implementation includes C1 to C5.

C1: Assign an order value to a leaf node in each right table chain.

After the right table chain is determined, the leaf node in the right table chain is the node with the earliest execution order, and the leaf node in each right table chain is assigned an order value. For example, each of the leaf nodes in the right table chain is assigned a value of 0. This is only an example here and does not constitute a limitation. A value other than 0 may alternatively be assigned. In addition, the order values of the leaf nodes in each right table chain may be the same or different.

It can be understood that, when there are a plurality of right table chains, each right table chain needs to be traversed, and during the process of traversing the operator nodes in each right table chain, the other operator nodes in the query plan tree are traversed, and order values are assigned to the operator nodes traversed. In other words, steps C1 to C5 need to be performed for each right table chain, but the order value results between them do not affect each other.

For example, the right table chains are a right table chain 1 and a right table chain 2. During traversing of the right table chain 1, the other operator nodes in the query plan tree are also traversed, and a set of order values of the operator nodes finally traversed is represented by a set 1. The set 1 includes the operator nodes traversed for this time and the order values of the operator nodes. During traversing of the right table chain 2, the other operator nodes in the query plan tree are also traversed, and a set of order values of the operator nodes finally traversed is represented by a set 2. The set 2 includes the operator nodes traversed for this time and the order values of the operator nodes. Then, the set 1 and the set 2 do not affect each other. They may be used separately to search for the two identical common temporary table consumption operator nodes in the query plan tree that have a scheduling dependency relationship. As long as the two identical common temporary table consumption operator nodes having the scheduling dependency relationship are found and can satisfy the subsequent S204, it is determined that there is a scheduling deadlock.

C2: Determine an operator node traversed in the right table chain as a current node, and obtain a parent node of the current node, the parent node of the current node being a parent node of the current node in the right table chain.

Steps C2 to C5 are described using a right table chain as an example. It can be learned that the leaf node in the right table chain is the operator node initially traversed in the right table chain, then the current node is initially the leaf node in the right table chain.

C3: If the parent node of the current node is not empty and is not the hash join operator node, assign an order value of the current node to the parent node of the current node, determine the parent node of the current node as a next operator node to be traversed in the right table chain, and re-perform the step of determining an operator node traversed as a current node, and obtaining a parent node of the current node, and subsequent steps.

It can be understood that "the parent node of the current node is not empty and is not the hash join operator node" represents "a downstream operator node is not the hash join operator node" in the order rules. "Assigning the order value of the current node to the parent node of the current node" represents "determining execution orders of an upstream operator node and an adjacent downstream operator node to be the same" in the order rules.

For example, when the leaf node in the right table chain is assigned a value of 0, if its parent node in the right table chain is not empty and is not the hash join operator node, the parent node of the leaf node is also assigned a value of 0.

Then, the parent node of the current node is determined as a next operator node to be traversed in the right table chain, and C2 and subsequent steps are re-executed until the traversing is completed. In other words, the operator nodes in the right table chain are traversed subsequently from bottom to top starting from the leaf node in the right table chain.

C4: If the parent node of the current node is not empty and is the hash join operator node, assign the sum of the order value of the current node and a preset value to the parent node of the current node and a left child node of the parent node of the current node, use the left child node of the parent node of the current node as an object node to execute a left table chain determination logic thereon, and use the current node as the object node to execute the left table chain determination logic thereon; and determine the parent node of the current node as a next operator node to be traversed in the right table chain, and re-perform the step of determining an operator node traversed as a current node, and obtaining a parent node of the current node, and subsequent steps.

It can be understood that since the current node is a node in the right table chain, if the parent node of the current node is not empty and is the hash join operator node, the current node is a right child node of the hash join operator node.

Further, "if the parent node of the current node is not empty and is the hash join operator node, assign the sum of the order value of the current node and a preset value to the parent node of the current node and a left child node of the parent node of the current node" in this step corresponds to "when there is a hash join operator node, determining that an execution order of the hash join operator node is later than an execution order of a right child node of the hash join operator node, and is the same as an execution order of a left child node of the hash join operator node" in the order rules.

As an optional example, the preset value may be 1, which is not limited here. For example, the order value of the current node is 0, the preset value is 1, and the parent node of the current node is not empty and is the hash join operator node. Then, the order value of the parent node of the current node (Join operator node) is 1, and the left child node of the Join operator node is also 1.

Based on the above content, the left child node of the parent node of the current node and the current node are both used as object nodes to execute the left table chain determination logic thereon.

The left table chain determination logic is specifically as follows: determining whether the object node is the hash join operator node; and if yes, assigning an order value of the object node to a left child node of the object node; or if no, assigning the order value of the object node to each child node of the object node; and determining a child node of the object node that is assigned the order value as the object node, and re-performing the step of determining whether the object node is the hash join operator node and subsequent steps, until the object node is a leaf node.

It can be understood that the left child node in the above content is another operator node in the query plan tree other than the operator nodes in the right table chain.

Then, the parent node of the current node is determined as a next operator node to be traversed in the right table chain, and C2 and subsequent steps are re-executed until the traversing is completed. In other words, the operator nodes in the right table chain are traversed subsequently from bottom to top starting from the leaf node in the right table chain.

C5: If the current node is not the hash join operator node and the parent node of the current node is empty, use the current node as the object node to execute the left table chain determination logic thereon.

The current node is not the hash join operator node and the parent node of the current node is empty, which indicates that the current node is a root node in the right table chain. At this time, the traversing can be ended after traversing the root node. During traversing of the root node, if the root node is not the Join operator node, the current node is directly used as the object node and execute the left table chain determination logic thereon.

In addition, if the current node is the hash join operator node and the parent node of the current node is empty, the traversing process is directly ended.

To make C1 to C5 easier to understand, the order values of the operator nodes in the query plan trees are used as examples for description below with reference to FIG. 3A to FIG. 3E. The order values of the leaf nodes in the right table chain are all set to 0, and the preset value is set to 1.

As shown in FIG. 3A, there is one right table chain, and the flow relationship of the right table chain is CTE Producer-right CTE Consumer-Join. The leaf node in the right table chain is the CTE Producer, which is assigned a value of 0. Since the leaf node CTE Producer is the operator node initially traversed, it is determined as the current node. Its parent node in the right table chain is the right CTE Consumer. If the right CTE Consumer is not empty and is not the hash join operator node, the order value of the CTE Producer is assigned to the right CTE Consumer, and the order value of the right CTE Consumer is also 0. Then, the right CTE Consumer is determined as a next operator node to be traversed in the right table chain.

When the right CTE Consumer is traversed, the right CTE Consumer is the current node. Its parent node is not empty and is Join, then the sum of the order value of the right CTE Consumer and the preset value (that is, 0+1=1) is assigned to Join and the left child node of Join (that is, the left CTE Consumer). In addition, the left CTE Consumer is used as the object node to execute the left table chain determination logic thereon, and the right CTE Consumer is used as the object node to execute the left table chain determination logic thereon. It can be understood that when each of the left CTE Consumer and the right CTE Consumer is used as the object node to execute the left table chain determination logic thereon, it is determined as not Join, then its child nodes are assigned its order value. Since the child nodes of both the left CTE Consumer and the right CTE Consumer are the CTE Producer, the CTE Producer is re-assigned order values of 1 and 0, respectively.

Then, the parent node of the right CTE Consumer in the right table chain (that is, Join) is determined as a next operator node to be traversed in the right table chain. When Join is traversed, Join is the current node. Since its parent node is empty, Join is the root node in the right table chain, and the traversing process is directly ended.

It can be learned based on the above content that the order value of the CTE Producer is assigned three times, with the first time being when the CTE Producer is assigned a value of 0 when it is initially traversed. Subsequently, since the order value of the right CTE Consumer is 0, the CTE Producer is assigned a value of 0 when executing the left table chain determination logic. Since the order value of the left CTE Consumer is 1, the CTE Producer is assigned a value of 1 when executing the left table chain determination logic. It can be learned after the traversing is ended that the left CTE Consumer and the right CTE Consumer use the same CTE Producer, but the assigned values of the left CTE Consumer and the right CTE Consumer are different, and the plurality of assigned values of the CTE Producer are different.

As shown in FIG. 3B, there are two right table chains, the flow relationship of one right table chain is Scan-layer-3 Join, and the flow relationship of the other right table chain is CTE Producer-layer-3 CTE Consumer-layer-4 Join.

The right table chain with the flow relationship of Scan-layer-3 Join is used as an example. The leaf node in the right table chain is Scan, which is assigned a value of 0. Since the leaf node Scan is the operator node initially traversed, it is determined as the current node. Its parent node in the right table chain is the layer-3 Join. The layer-3 Join is not empty and is the hash join operator node, then the sum of the order value of Scan and the preset value (that is, 0+1=1) is assigned to the layer-3 Join and the left child node of the layer-3 Join (that is, the layer-2 CTE Consumer). In addition, the layer-2 CTE Consumer is used as the object node to execute the left table chain determination logic thereon. When the layer-2 CTE Consumer is used as the object node to execute the left table chain determination logic thereon, it is determined as not Join, then its child nodes are assigned its order value, that is, the CTE Producer is assigned 1. However, since Scan has no child node, the left table chain determination logic is not executed on it.

Then, the parent node of Scan in the right table chain (that is, the layer-3 Join) is determined as a next operator node to be traversed in the right table chain. When the layer-3 Join is traversed, the layer-3 Join is the current node. Since its parent node is empty, the layer-3 Join is the root node in the right table chain, and the traversing process is directly ended.

In this traversing process, there are no two identical CTE Consumers traversed, and the CTE Producer is assigned only one value, not a plurality of values.

The right table chain with the flow relationship of CTE Producer-layer-3 CTE Consumer-layer-4 Join is used as an example. The leaf node in the right table chain is the CTE Producer, which is assigned a value of 0. Since the leaf node CTE Producer is the operator node initially traversed, it is determined as the current node. Its parent node in the right table chain is the layer-3 CTE Consumer. The layer-3 CTE Consumer is not empty and is not the hash join operator node, then the order value of the CTE Producer is assigned to the layer-3 CTE Consumer, and the order value of the layer-3 CTE Consumer is also 0. Then, the layer-3 CTE Consumer is determined as a next operator node to be traversed in the right table chain.

When the layer-3 CTE Consumer is traversed, the layer-3 CTE Consumer is the current node. Its parent node is not empty and is the layer-4 Join, then the sum of the order value of the layer-3 CTE Consumer and the preset value (that is, 0+1=1) is assigned to the layer-4 Join and the left child node of the layer-4 Join (that is, the layer-3 Join). In addition, the layer-3 Join and the layer-3 CTE Consumer are used as object nodes to execute the left table chain determination logic thereon separately. When the layer-3 Join is used as the object node to execute the left table chain determination logic thereon, it is determined as Join, then its left child node, that is, the layer-2 CTE Consumer, is assigned the order value of 1 of the layer-3 Join. Then, the layer-2 CTE Consumer is used as the object node. Since it is not Join, then its left and right child nodes are assigned the order value of 1 of the layer-2 CTE Consumer, that is, the CTE Producer is assigned 1. The layer-3 CTE Consumer is used as the object node to execute the left table chain determination logic thereon. It is not Join, then its left and right child nodes are assigned the order value of 0 of the layer-3 CTE Consumer, that is, the CTE Producer is assigned 0.

Then, the parent node of the layer-3 CTE Consumer in the right table chain (that is, the layer-4 Join) is determined as a next operator node to be traversed in the right table chain. When the layer-4 Join is traversed, the layer-4 Join is the current node. Since its parent node is empty, the layer-4 Join is the root node in the right table chain, and the traversing process is directly ended.

In this traversing process, the order value of the CTE Producer is assigned three times, with the first time being when the CTE Producer is assigned a value of 0 when it is initially traversed. Subsequently, since the order value of the layer-2 CTE Consumer is 1, the CTE Producer is assigned a value of 1 when executing the left table chain determination logic. Since the order value of the layer-3 CTE Consumer is 0, the CTE Producer is assigned a value of 0 when executing the left table chain determination logic. It can be learned after the traversing is ended that, the layer-2 CTE Consumer and the layer-3 CTE Consumer use the same CTE Producer, but the assigned values of the layer-2 CTE Consumer and the layer-3 CTE Consumer are different, and the plurality of assigned values of the CTE Producer are different.

As shown in FIG. 3C, there are two right table chains, the flow relationship of one right table chain is CTE Producer-layer-2 CTE Consumer-layer-3 Join, and the flow relationship of the other right table chain is CTE Producer-layer-3 CTE Consumer-layer-4 Join.

The right table chain with the flow relationship of CTE Producer-layer-2 CTE Consumer-layer-3 Join is first used as an example. The leaf node in the right table chain is the CTE Producer, which is assigned a value of 0. Since the leaf node CTE Producer is the operator node initially traversed, it is determined as the current node. Its parent node in the right table chain is the layer-2 CTE Consumer. The layer-2 CTE Consumer is not empty and is not the hash join operator node, then the order value of the CTE Producer is assigned to the layer-2 CTE Consumer, and the order value of the layer-2 CTE Consumer is also 0. Then, the layer-2 CTE Consumer is determined as a next operator node to be traversed in the right table chain.

When the layer-2 CTE Consumer is traversed, the layer-2 CTE Consumer is the current node. Its parent node is not empty and is the layer-3 Join, then the sum of the order value of the layer-2 CTE Consumer and the preset value (that is, 0+1=1) is assigned to the layer-3 Join and the left child node of the layer-3 Join (that is, the Scan operator node). In addition, Scan and the layer-2 CTE Consumer are used as object nodes to execute the left table chain determination logic thereon separately. When the layer-2 CTE Consumer is used as the object node to execute the left table chain determination logic thereon, it is determined as not Join, then its left and right child nodes are assigned the order value of 0 of the layer-2 CTE Consumer, that is, the CTE Producer is assigned 0. However, since Scan has no child node, the left table chain determination logic is not executed on it.

Then, the parent node of the layer-2 CTE Consumer in the right table chain (that is, the layer-3 Join) is determined as a next operator node to be traversed in the right table chain. When the layer-3 Join is traversed, the layer-3 Join is the current node. Since its parent node is empty, the layer-3 Join is the root node in the right table chain, and the traversing process is directly ended.

In this traversing process, the order value of the CTE Producer is assigned twice, with the first time being when the CTE Producer is assigned a value of 0 when it is initially traversed. Subsequently, since the order value of the layer-2 CTE Consumer is 0, the CTE Producer is assigned a value of 0 when executing the left table chain determination logic. Therefore, in this traversing process, there are no two identical CTE Consumers traversed, and the two assigned values of the CTE Producer are the same.

The right table chain with the flow relationship of CTE Producer-layer-3 CTE Consumer-layer-4 Join is used as an example. The leaf node in the right table chain is the CTE Producer, which is assigned a value of 0. Since the leaf node CTE Producer is the operator node initially traversed, it is determined as the current node. Its parent node in the right table chain is the layer-3 CTE Consumer. The layer-3 CTE Consumer is not empty and is not the hash join operator node, then the order value of the CTE Producer is assigned to the layer-3 CTE Consumer, and the order value of the layer-3 CTE Consumer is also 0. Then, the layer-3 CTE Consumer is determined as a next operator node to be traversed in the right table chain.

When the layer-3 CTE Consumer is traversed, the layer-3 CTE Consumer is the current node. Its parent node is not empty and is the layer-4 Join, then the sum of the order value of the layer-3 CTE Consumer and the preset value (that is, 0+1=1) is assigned to the layer-4 Join and the left child node of the layer-4 Join (that is, the layer-3 Join). In addition, the layer-3 Join and the layer-3 CTE Consumer are used as object nodes to execute the left table chain determination logic thereon separately. When the layer-3 Join is used as the object node to execute the left table chain determination logic thereon, it is determined as Join, then its left child node, that is, Scan, is assigned the order value of 1 of the layer-3 Join. Then, the layer-3 CTE Consumer is used as the object node. Since it is not Join, then its left and right child nodes are assigned the order value of 1 of the layer-3 CTE Consumer, that is, the CTE Producer is assigned 1.

Then, the parent node of the layer-3 CTE Consumer in the right table chain (that is, the layer-4 Join) is determined as a next operator node to be traversed in the right table chain. When the layer-4 Join is traversed, the layer-4 Join is the current node. Since its parent node is empty, the layer-4 Join is the root node in the right table chain, and the traversing process is directly ended.

In this traversing process, the order value of the CTE Producer is assigned once, that is, the first time when the CTE Producer is assigned a value of 0 when it is initially traversed. Therefore, in this traversing process, there are no two identical CTE Consumers traversed, and the CTE Producer is value assigned only once.

As shown in FIG. 3D, there is one right table chain, and the flow relationship of the right table chain is Scan-layer-3 Join-layer-4 Join. The leaf node in the right table chain is Scan, which is assigned a value of 0. Since the leaf node Scan is the operator node initially traversed, it is determined as the current node. Its parent node in the right table chain is the layer-3 Join. The layer-3 Join is not empty and is the hash join operator node, then the sum of the order value of Scan and the preset value (that is, 0+1=1) is assigned to the layer-3 Join and the left child node of the layer-3 Join (that is, the layer-2 CTE Consumer). In addition, the layer-2 CTE Consumer is used as the object node to execute the left table chain determination logic thereon. When the layer-2 CTE Consumer is used as the object node to execute the left table chain determination logic thereon, it is determined as not Join, then its child nodes are assigned its order value, that is, the CTE Producer is assigned 1. However, since Scan has no child node, the left table chain determination logic is not executed on it.

Then, the parent node of Scan (that is, the layer-3 Join) is determined as a next operator node to be traversed in the right table chain. When the layer-3 Join is traversed, the layer-3 Join is the current node. Its parent node is not empty and is the layer-4 Join, then the sum of the order value of the layer-3 Join and the preset value (that is, 1+1=2) is assigned to the layer-4 Join and the left child node of the layer-4 Join (that is, the layer-3 CTE Consumer). In addition, the layer-3 CTE Consumer and the layer-3 Join are used as object nodes to execute the left table chain determination logic thereon separately. When the layer-3 CTE Consumer is used as the object node to execute the left table chain determination logic thereon, it is determined as not Join, then its left and right child nodes are assigned the order value of 2 of the layer-3 CTE Consumer, that is, the CTE Producer is assigned 2. When the layer-3 Join is used as the object node to execute the left table chain determination logic thereon, it is determined as Join, then its left child node is assigned the order value of 1 of the layer-3 Join, that is, the layer-2 CTE Consumer is assigned a value of 2. Then, the layer-2 CTE Consumer is used as the object node to execute the left table chain determination logic thereon, such that the CTE Producer is assigned a value of 1.

Then, the parent node of the layer-3 Join in the right table chain (that is, the layer-4 Join) is determined as a next operator node to be traversed in the right table chain. When the layer-4 Join is traversed, the layer-4 Join is the current node. Since its parent node is empty, the layer-4 Join is the root node in the right table chain, and the traversing process is directly ended.

In this traversing process, the order value of the CTE Producer is assigned three times, and the three assigned values are 1, 2, and 1, respectively. In addition, in this traversing process, the layer-2 CTE Consumer and the layer-3 CTE Consumer use the same CTE Producer, and the layer-2 CTE Consumer and the layer-3 CTE Consumer are assigned different values (which are 1 and 2, respectively), such that the plurality of assigned values of the CTE Producer are different.

As shown in FIG. 3E, there are two right table chains, the flow relationship of one right table chain is CTE Producer [0]-CTE Consumer[0](2)-Join[3]-Union, and the flow relationship of the other right table chain is CTE Producer [1]-CTE Consumer[1](1)-Join[2]-Union.

The right table chain with the flow relationship of CTE Producer [0]-CTE Consumer[0](2)-Join[3]-Union is first used as an example. The leaf node in the right table chain is the CTE Producer [0], which is assigned a value of 0. Since the leaf node CTE Producer [0] is the operator node initially traversed, it is determined as the current node. Its parent node in the right table chain is the CTE Consumer[0](2). The CTE Consumer[0](2) is not empty and is not the hash join operator node, then the CTE Consumer[0](2) is assigned the order value of the CTE Producer [0], and the order value of the CTE Consumer[0](2) is also 0. Then, the CTE Consumer [0](2) is determined as a next operator node to be traversed in the right table chain.

When the CTE Consumer[0](2) is traversed, the CTE Consumer[0](2) is the current node. Its parent node is not empty and is the Join[3], then the sum of the order value of the CTE Consumer[0](2) and the preset value (that is, 0+1=1) is assigned to the Join[3] and the left child node of the Join[3](that is, the CTE Consumer[1](2)). In addition, the CTE Consumer[1](2) and the CTE Consumer[0](2) are used as object nodes to execute the left table chain determination logic thereon separately. When the CTE Consumer [1](2) is used as the object node to execute the left table chain determination logic thereon, it is determined as not Join, then its left and right child nodes, that is, the CTE Producer [1], are assigned the order value of 1 of the CTE Consumer[1](2). Then, the CTE Consumer[0](2) is used as the object node. It is not Join, then its left and right child nodes are assigned the order value of 0 of the CTE Consumer[0](2), that is, the CTE Producer [0] is assigned 0.

Then, the Join[3](the parent node of the CTE Consumer [0](2) in the right table chain) is determined as a next operator node to be traversed in the right table chain. When the Join[3] is traversed, the Join[3] is the current node. Its parent node is not empty and is the Union, and the Union is not Join. Then, the Union is assigned the order value of 1 of the Join[3].

Then, the Union (the parent node of the Join[3] in the right table chain) is determined as a next operator node to be traversed in the right table chain. When the Union is traversed, the Union is the current node. Since it is not Join and its parent node is empty, the Union is the root node in the right table chain. In addition, the Union is directly used as the object node to execute the left table chain determination logic thereon. Since the Union is not Join, when the left table chain determination logic is executed thereon, its left and right child nodes are assigned the order value of 1 of the Union, that is, both the Join[2] and the Join[3] are assigned the value of 1, indicating that the Join[2] and the Join[3] are executed simultaneously. Then, the Join[2] and the Join[3] are used as object nodes to execute the left table chain determination logic thereon separately, such that the CTE Consumer[0](1) and the CTE Producer [0] are 1, and the CTE Consumer[1](2) and the CTE Producer [1] are 1.

In this traversing process, the order value of the CTE Producer [0] is assigned three times, and the three assigned values are 0, 0, and 1, respectively. The order value of the CTE Producer [1] is assigned twice, and the two assigned values are both 1. Therefore, in this traversing process, the CTE Consumer[0](1) and the CTE Consumer[0](2) use the same CTE Producer [0], and the CTE Consumer[0](1) and the CTE Consumer[0](2) are assigned different values (which are 1 and 0, respectively), such that the CTE Producer [0] is assigned different values of 1 and 0.

The right table chain with the flow relationship of CTE Producer [1]-CTE Consumer[1](1)-Join[2]-Union is used as an example again. The leaf node in the right table chain is the CTE Producer [1], which is assigned a value of 0. Since the leaf node CTE Producer [1] is the operator node initially traversed, it is determined as the current node. Its parent node in the right table chain is the CTE Consumer[1](1). The CTE Consumer[1](1) is not empty and is not the hash join operator node, then the CTE Consumer[1](1) is assigned the order value of the CTE Producer [1], and the order value of the CTE Consumer[1](1) is also 0. Then, the CTE Consumer [1](1) is determined as a next operator node to be traversed in the right table chain.

When the CTE Consumer[1](1) is traversed, the CTE Consumer[1](1) is the current node. Its parent node is not empty and is the Join[2], then the sum of the order value of the CTE Consumer[1](1) and the preset value (that is, 0+1=1) is assigned to the Join[2] and the left child node of the Join[2](that is, the CTE Consumer[0](1)). In addition, the CTE Consumer[0](1) and the CTE Consumer[1](1) are used as object nodes to execute the left table chain determination logic thereon separately. When the CTE Consumer [0](1) is used as the object node to execute the left table chain determination logic thereon, it is determined as not Join, then its left and right child nodes, that is, the CTE Producer [0], are assigned the order value of 1 of the CTE Consumer[0](1). Then, the CTE Consumer[1](1) is used as the object node. It is not Join, then its left and right child nodes are assigned the order value of 0 of the CTE Consumer[1](1), that is, the CTE Producer [1] is assigned 0.

Then, the Join[2](the parent node of the CTE Consumer [1](1) in the right table chain) is determined as a next operator node to be traversed in the right table chain. When the Join[2] is traversed, the Join[2] is the current node. Its parent node is not empty and is the Union, and the Union is not Join. Then, the Union is assigned the order value of 1 of the Join[2].

Then, the Union (the parent node of the Join[2] in the right table chain) is determined as a next operator node to be traversed in the right table chain. When the Union is traversed, the Union is the current node. Since it is not Join and its parent node is empty, the Union is the root node in the right table chain. In addition, the Union is directly used as the object node to execute the left table chain determination logic thereon. Since the Union is not Join, when the left table chain determination logic is executed thereon, its left and right child nodes are assigned the order value of 1 of the Union, that is, both the Join[2] and the Join[3] are assigned the value of 1, indicating that the Join[2] and the Join[3] are executed simultaneously. Then, the Join[2] and the Join[3] are used as object nodes to execute the left table chain determination logic thereon separately, such that the CTE Consumer[0](1) and the CTE Producer [0] are 1, and the CTE Consumer[1](2) and the CTE Producer [1] are 1.

In this traversing process, the order value of the CTE Producer [0] is assigned twice, and the two assigned values are both 1. The order value of the CTE Producer [1] is assigned three times, and the three assigned values are 0, 0, and 1, respectively. Therefore, in this traversing process, the CTE Consumer[1](1) and the CTE Consumer[1](2) use the same CTE Producer [1], and the CTE Consumer[1](1) and the CTE Consumer[1](2) are assigned different values (which are 0 and 1, respectively), such that the CTE Producer [1] is assigned different values of 1 and 0.

S204: Determine that there is a scheduling deadlock when upstream operator nodes of the two identical common temporary table consumption operator nodes that have the scheduling dependency relationship are the same common temporary table production operator node.

It can be understood that the execution orders of the two identical common temporary table consumption operator nodes are different, which indicates that one of the common temporary table consumption operator nodes starts to be executed only after the other common temporary table consumption operator node is executed. This is reflected as a dependency relationship. The dependency relationship is caused by the Join operator node. When the upstream operator nodes of the two identical common temporary table consumption operator nodes that have the scheduling dependency relationship are the same common temporary table production operator node, since the same common temporary table production operator node outputs data to the two identical common temporary table consumption operator nodes, data caching may occur during execution, which in turn causes a scheduling deadlock. It can be learned that, in this step, whether there is a scheduling deadlock during execution of the query plan tree can be detected, and the two identical common temporary table consumption operator nodes that cause the scheduling deadlock and the same upstream common temporary table production operator node can also be accurately determined. In this way, the operator nodes that cause the scheduling deadlock can be processed in a targeted manner to improve processing efficiency.

The scheduling deadlock in the query plan tree is determined using FIG. 3A to FIG. 3E as examples. As shown in FIG. 3A, the left CTE Consumer and the right CTE Consumer are two identical CTE Consumers, and the left CTE Consumer and the right CTE Consumer are assigned different values, then there is a scheduling dependency relationship between the left CTE Consumer and the right CTE Consumer. Since the left CTE Consumer and the right CTE Consumer use the same CTE Producer, there is a scheduling deadlock in the query plan tree. The scheduling deadlock is caused by the scheduling dependency of the left CTE Consumer on the right CTE Consumer under the same CTE Producer. It may be understood as the scheduling dependency of the left CTE Consumer in the chain other than the right table chain in the query plan tree on the right CTE Consumer in the right sub-chain of the Join operator node in the right table chain. In other words, the CTE Consumers and the CTE Producer that cause the scheduling deadlock can be accurately learned.

As shown in FIG. 3B, it is learned based on the traversing of the right table chain with the flow relationship of Scan-layer-3 Join that there are no two identical CTE Consumers, and the CTE Producer is assigned only one value, not a plurality of values. Therefore, there is no scheduling deadlock. It is learned based on the traversing of the right table chain of CTE Producer-layer-3 CTE Consumer-layer-4 Join that, the layer-2 CTE Consumer and the layer-3 CTE Consumer are two identical CTE Consumers, and the layer-2 CTE Consumer and the layer-3 CTE Consumer are assigned different values, then there is a scheduling dependency relationship between the layer-2 CTE Consumer and the layer-3 CTE Consumer. Since the layer-2 CTE Consumer and the layer-3 CTE Consumer use the same CTE Producer, there is a scheduling deadlock in the query plan tree. The scheduling deadlock is caused by the scheduling dependency of the layer-2 CTE Consumer on the layer-3 CTE Consumer under the same CTE Producer. It may be understood as the scheduling dependency of the layer-2 CTE Consumer in the chain other than the right table chain in the query plan tree on the layer-3 CTE Consumer in the right sub-chain of the layer-4 Join operator node in the right table chain. In other words, the CTE Consumers and the CTE Producer that cause the scheduling deadlock can be accurately learned.

As shown in FIG. 3C, it is learned based on the traversing of the right table chain with the flow relationship of CTE Producer-layer-2 CTE Consumer-layer-3 Join that, there are no two identical CTE Consumers traversed, and the two assigned values of the CTE Producer are the same. Therefore, there is no scheduling deadlock. It is learned based on the traversing of the right table chain with the flow relationship of CTE Producer-layer-3 CTE Consumer-layer-4 Join that, there are no two identical CTE Consumers traversed, and the CTE Producer is value assigned only once. Therefore, there is also no scheduling deadlock. Therefore, although there are two identical CTE Consumers (that is, the layer-2 CTE Consumer and the layer-3 CTE Consumer) in the query plan tree shown in FIG. 3C, and the two identical CTE Consumers are under the nested Join operator nodes and share the same CTE Producer, but the two identical CTE Consumers are not simultaneously traversed in the processes of traversing the two right table chains, then there is no scheduling deadlock. It can be learned through specific analysis that, since the execution method of the Join is first processing the data in the right child node, and both the layer-2 CTE Consumer and the layer-3 CTE Consumer are the right child nodes under the Join operator nodes, there is no case where the execution orders of the layer-2 CTE Consumer and the layer-3 CTE Consumer are different.

As shown in FIG. 3D, it is learned based on the traversing of the right table chain with the flow relationship of Scan-layer-3 Join-layer-4 Join that, the layer-2 CTE Consumer and the layer-3 CTE Consumer are two identical CTE Consumers, and the layer-2 CTE Consumer and the layer-3 CTE Consumer are assigned different values (which are 1 and 2, respectively), then there is a scheduling dependency relationship between the layer-2 CTE Consumer and the layer-3 CTE Consumer. Since the layer-2 CTE Consumer and the layer-3 CTE Consumer use the same CTE Producer, there is a scheduling deadlock in the query plan tree. The scheduling deadlock is caused by the scheduling dependency of the layer-3 CTE Consumer on the layer-2 CTE Consumer under the same CTE Producer. It may be understood as the scheduling dependency of the layer-3 CTE Consumer in the chain other than the right table chain in the query plan tree on the layer-2 CTE Consumer in the right sub-chain of the layer-4 Join operator node in the right table chain. In other words, the CTE Consumers and the CTE Producer that cause the scheduling deadlock can be accurately learned.

As shown in FIG. 3E, it is learned based on the traversing of the right table chain with the flow relationship of CTE Producer [0]-CTE Consumer[0](2)-Join[3]-Union that, the CTE Consumer[0](1) and the CTE Consumer[0](2) are two identical CTE Consumers, and the CTE Consumer[0](1) and the CTE Consumer[0](2) are assigned different values (which are 1 and 0, respectively), then there is a scheduling dependency relationship between the CTE Consumer[0](1) and the CTE Consumer[0](2). Since the CTE Consumer[0](1) and the CTE Consumer[0](2) use the same CTE Producer [0], there is a scheduling deadlock in the query plan tree. The scheduling deadlock is caused by the scheduling dependency of the CTE Consumer[0](1) on the Consumer [0](2) under the same CTE Producer [0]. It may be understood as the scheduling dependency of the CTE Consumer [0](1) in the chain other than the right table chain in the query plan tree on the Consumer[0](2) in the right sub-chain of the Join[3] in the right table chain. In other words, the CTE Consumers (that is, the CTE Consumer[0](1) and the Consumer[0](2)) and the CTE Producer [0] that cause the scheduling deadlock can be accurately learned.

It is learned based on the traversing of the right table chain of CTE Producer [1]-CTE Consumer[1](1)-Join[2]-Union that, the CTE Consumer[1](1) and the CTE Consumer[1](2) are two identical CTE Consumers, and the CTE Consumer [1](1) and the CTE Consumer[1](2) are assigned different values (which are 0 and 1, respectively), then there is a scheduling dependency relationship between the CTE Consumer[1](1) and the CTE Consumer[1](2). Since the CTE Consumer[1](1) and the CTE Consumer[1](2) use the same CTE Producer [1], there is a scheduling deadlock in the query plan tree. The scheduling deadlock is caused by the scheduling dependency of the CTE Consumer[1](2) on the CTE Consumer[1](1) under the same CTE Producer [1]. It may be understood as the scheduling dependency of the CTE Consumer[1](2) in the chain other than the right table chain in the query plan tree on the CTE Consumer[1](1) in the right sub-chain of the Join[2] in the right table chain. In other words, the CTE Consumers (that is, the CTE Consumer[1](1) and the CTE Consumer[1](2)) and the CTE Producer [1] that cause the scheduling deadlock can be accurately learned.

It can be learned from the above content that, whether there is a scheduling deadlock may also be determined based on whether the same CTE Producer is assigned a plurality of values and whether the plurality of assigned values are the same. In other words, after the traversing of the right table chain is completed, if the plurality of assigned values of the same CTE Producer are different, it is determined that there is a scheduling deadlock.

In a possible implementation, this embodiment of the present application provides a specific implementation for determining that there is a scheduling deadlock when upstream operator nodes of the two identical common temporary table consumption operator nodes that have the scheduling dependency relationship are the same common temporary table production operator node. The specific implementation includes:

determining that there is a scheduling deadlock when the upstream operator nodes of the two identical common temporary table consumption operator nodes that have the scheduling dependency relationship are the same common temporary table production operator node and the common temporary table does not meet a preset condition, where the preset condition is that a data amount of target data is less than a data amount threshold or an execution time of the common temporary table consumption operator node for the target data is less than a time threshold, and the target data is obtained from the common temporary table.

The target data is obtained from the common temporary table and is related to the query plan. It is data that cannot be processed after being sent from the common temporary table production operator node to the common temporary table consumption operator node. The data amount of the target data is specifically determined by the query plan tree. It can be learned that this embodiment of the present application does not limit the data amount threshold and the time threshold, which may be set according to actual situations.

It can be understood that if there is a scheduling deadlock during the execution of the query plan tree, however, whether there is a deadlock is also related to an actual data amount of data stored in the buffer and an execution time of the operators in practical applications. For example, if the data amount in the buffer of the common temporary table consumption operator node is small or the data in the buffer can be processed in a very short time, there is no scheduling deadlock in practice.

Figure 4:
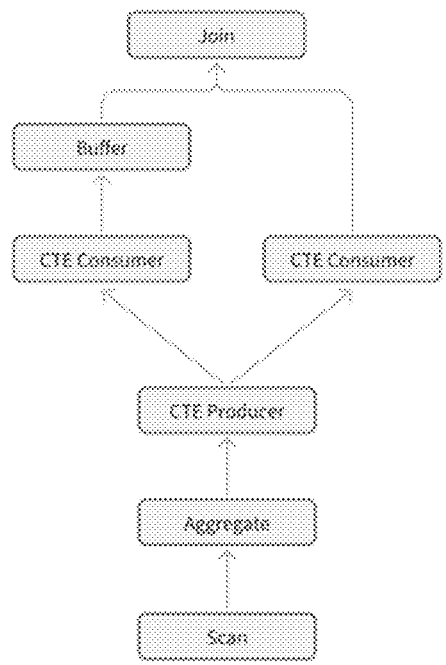
FIG. 4 is a schematic diagram of a query plan tree with a cache operator added according to an embodiment of the present application.

Referring to FIG. 4, FIG. 4 is a schematic diagram of a query plan tree with a cache operator added according to an embodiment of the present application. With reference to FIG. 4, the method provided in this embodiment of the present application further includes the following steps:

when it is determined that there is a scheduling deadlock, obtaining a target common temporary table consumption operator node in the query plan tree that caches the target data, the target data being data that cannot be processed by a target hash join operator node due to the scheduling deadlock, and the target hash join operator being a parent node of the target common temporary table consumption operator node; and adding a cache operator between the target common temporary table consumption operator node and the target hash join operator node, to store the target data into a storage space corresponding to the cache operator.

The target data is also data that cannot be processed after being sent from the common temporary table production operator node to the target common temporary table consumption operator node.

The cache operator may be called a Buffer operator. As shown in FIG. 4, the left CTE Consumer has scheduling dependency on the right CTE Consumer, resulting in a scheduling deadlock. In this case, the target common temporary table consumption operator node is the left CTE Consumer, and the target hash join operator node is the Join operator node. Then, a Buffer operator is added between the left CTE Consumer and the Join to store the target data into the Buffer operator. A storage device in the Buffer operator may include a dedicated memory and/or a disk, to provide a storage space. Then, the target data may be cached in the dedicated memory or overflowed to the disk, to avoid exhaustion of the buffer in the left CTE Consumer as much as possible, thereby ensuring normal execution of the query.

In addition, to avoid the scheduling deadlock in the query plan tree as much as possible, the query plan tree referencing the CTE and Join operator nodes may also be rewritten in the inline mode.

Based on the implementations provided in the above aspects, the present application may also combine the implementations to provide more implementations.

Those skilled in the art can understand that, in the above methods of the specific implementations, the order in which the steps are written does not imply a strict execution order, and does not constitute any limitation on the implementation process. The specific execution order of the steps should be determined by their functions and possible internal logics.

Based on the method for detecting a scheduling deadlock in data query provided in the above method embodiment, this embodiment of the present application further provides an apparatus for detecting a scheduling deadlock in data query. The apparatus for detecting a scheduling deadlock in data query is described below with reference to the accompanying drawings. Since the principle of solving the problem by the apparatus in this embodiment of the present disclosure is similar to the above method for detecting a scheduling deadlock in data query in the embodiments of the present application, for the implementation of the apparatus, reference may be made to the implementation of the method, and the repeated parts will not be described.

Figure 5:
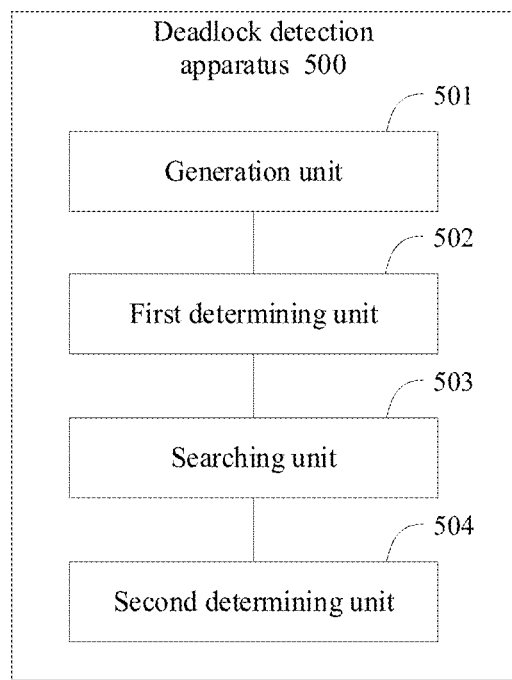
FIG. 5 is a schematic diagram of a structure of an apparatus for detecting a scheduling deadlock in data query according to an embodiment of the present application.

Reference is made to FIG. 5, which is a schematic diagram of a structure of an apparatus for detecting a scheduling deadlock in data query according to an embodiment of the present application. As shown in FIG. 5, the apparatus for detecting a scheduling deadlock in data query includes:

a generation unit 501 configured to obtain a query statement, and generate a query plan tree corresponding to the query statement, the query plan tree including a plurality of operator nodes and a query logical relationship between the plurality of operator nodes, and the operator nodes including a common temporary table production operator node, a common temporary table consumption operator node, and a hash join operator node;

a first determining unit 502 configured to traverse the query plan tree to determine at least one right table chain in the query plan tree, the right table chain including a leaf node and a root node that is not the hash join operator node in the query plan tree, where when a parent node of an operator node in the right table chain is the hash join operator node, the operator node is a right child node of its parent node, and the right table chain includes the parent node of the operator node;

a searching unit 503 configured to traverse the operator nodes in the right table chain from bottom to top starting from the leaf node in the right table chain, and traverse the other operator nodes in the query plan tree, to analyze an execution order relationship between the operator nodes traversed in the query plan tree, and search for two identical common temporary table consumption operator nodes in the query plan tree that have a scheduling dependency relationship, the scheduling dependency relationship representing different execution orders of the two identical common temporary table consumption operator nodes; and a second determining unit 504 configured to determine that there is a scheduling deadlock when upstream operator nodes of the two identical common temporary table consumption operator nodes that have the scheduling dependency relationship are the same common temporary table production operator node.

In a possible implementation, the first determining unit 502 includes:
an assignment sub-unit configured to assign a first flag to a root node of the query plan tree;
a first traversing sub-unit configured to traverse the operator nodes in the query plan tree from top to bottom starting from the root node, and if the operator node traversed is the hash join operator node, assign the first flag to a right child node of the hash join operator node, and assign a second flag to a left child node of the hash join operator node; or if the operator node traversed is not the hash join operator node, assign a value of the operator node traversed to both the left child node and the right child node of the operator node, until reaching the leaf node of the query plan tree; and
a second traversing sub-unit configured to traverse operator nodes with the first flag in the query plan tree from bottom to top starting from the leaf node with the first flag, until reaching an operator node with the second flag, and determine a chain formed by the operator nodes traversed as the right table chain in the query plan tree,
where a number of right table chains in the query plan tree is equal to a number of leaf nodes with the first flag in the query plan tree.

In a possible implementation, the searching unit 503 includes:
a first determining sub-unit configured to determine the leaf node in the right table chain as a node with the earliest execution order;
a second determining sub-unit configured to traverse the operator nodes in the right table chain from bottom to top starting from the leaf node in the right table chain, and determine an execution order relationship between the operator nodes in the right table chain according to order rules; and a third determining sub-unit configured to traverse the other operator nodes of the query plan tree, and determine an execution order relationship between the other operator nodes according to the order rules,
where the order rules include one or more of the following:
when a downstream operator node is not the hash join operator node, determining that execution orders of an adjacent upstream operator node and the downstream operator node are the same; and
when there is the hash join operator node, determining that an execution order of the hash join operator node is later than an execution order of a right child node of the hash join operator node, and is the same as an execution order of a left child node of the hash join operator node.

In a possible implementation, the searching unit 503 includes:

a third traversing sub-unit configured to traverse the operator nodes in the right table chain from bottom to top starting from the leaf node in the right table chain, traverse the other operator nodes of the query plan tree, and assign order values to the operator nodes traversed, the order values being used to represent the execution order relationship between the operator nodes; and
a fourth determining sub-unit configured to determine two identical common temporary table consumption operator nodes with different order values in the query plan tree as the two identical common temporary table consumption operator nodes in the query plan tree that have the scheduling dependency relationship.

In a possible implementation, the third traversing sub-unit includes:
a first assignment sub-unit configured to assign an order value to a leaf node in each right table chain;
an obtaining sub-unit configured to determine an operator node traversed in the right table chain as a current node, and obtain a parent node of the current node, the parent node of the current node being a parent node of the current node in the right table chain;
a second assignment sub-unit configured to: if the parent node of the current node is not empty and is not the hash join operator node, assign an order value of the current node to the parent node of the current node, determine the parent node of the current node as a next operator node to be traversed in the right table chain, and re-perform the step of determining an operator node traversed as a current node, and obtaining a parent node of the current node, and subsequent steps;
a third assignment sub-unit configured to: if the parent node of the current node is not empty and is the hash join operator node, assign the sum of the order value of the current node and a preset value to the parent node of the current node and a left child node of the parent node of the current node, use the left child node of the parent node of the current node as an object node to execute a left table chain determination logic thereon, and use the current node as the object node to execute the left table chain determination logic thereon; and determine the parent node of the current node as a next operator node to be traversed in the right table chain, and re-perform the step of determining an operator node traversed as a current node, and obtaining a parent node of the current node, and subsequent steps; or
a fourth assignment sub-unit configured to: if the current node is not the hash join operator node and the parent node of the current node is empty, use the current node as the object node to execute the left table chain determination logic thereon, where the left table chain determination logic is determining whether the object node is the hash join operator node; and if yes, assign the order value of the object node to a left child node of the object node; or if no, assign the order value of the object node to each child node of the object node; and determine a child node of the object node that is assigned the order value as the object node, and re-perform the step of determining whether the object node is the hash join operator node and subsequent steps, until the object node is a leaf node.

In a possible implementation, the common temporary table production operator node is used to generate a common temporary table to be transferred to the common temporary table consumption operator node for use; and
the second determining unit 504 is specifically configured to:
determine that there is a scheduling deadlock when the upstream operator nodes of the two identical common temporary table consumption operator nodes that have the scheduling dependency relationship are the same common temporary table production operator node and the common temporary table does not meet a preset condition,
where the preset condition is that a data amount of target data is less than a data amount threshold or an execution time of the common temporary table consumption operator node for the target data is less than a time threshold, and the target data is obtained from the common temporary table.

In a possible implementation, the apparatus further includes:
an obtaining unit configured to: when it is determined that there is a scheduling deadlock, obtain a target common temporary table consumption operator node in the query plan tree that caches the target data, the target data being data that cannot be processed by a target hash join operator node due to the scheduling deadlock, and the target hash join operator being a parent node of the target common temporary table consumption operator node; and
an addition unit configured to add a cache operator between the target common temporary table consumption operator node and the target hash join operator node, to store the target data into a storage space corresponding to the cache operator.

It should be noted that, for specific implementation of the various units in the embodiments, reference may be made to the related description in the above method embodiment. The division of units in the embodiments of the present application is illustrative and is merely logical function division, and there may be other division methods in actual implementation. The various functional units in the embodiments of the present application may be integrated into one processing unit, or the various units may be physically present separately, or two or more units may be integrated into one unit. For example, in the above embodiment, a processing unit and a sending unit may be the same unit or different units. The integrated unit may be implemented in the form of hardware, or may be implemented in the form of a software function unit.

Based on the method for detecting a scheduling deadlock in data query provided in the above method embodiment, the present application further provides an electronic device. The electronic device includes: one or more processors; and a storage apparatus having one or more programs stored thereon, where the one or more programs, when executed by the one or more processors, cause the one or more processors to implement the method for detecting a scheduling deadlock in data query according to any one of the above embodiments.

Figure 6:
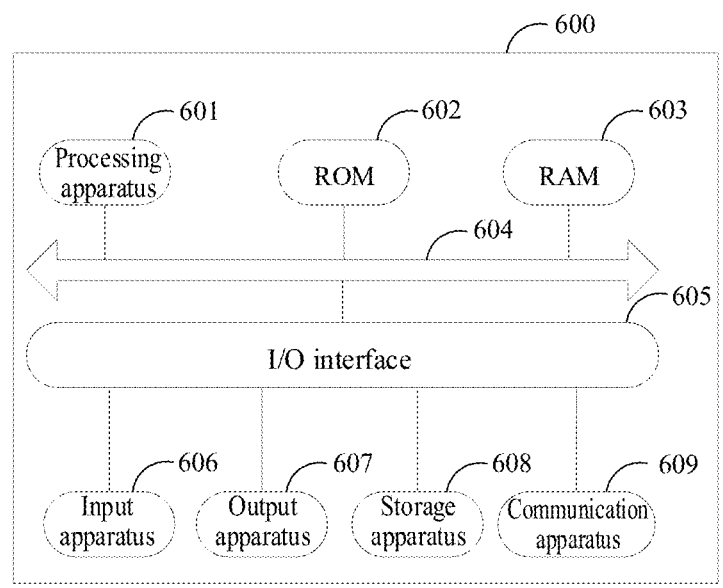
FIG. 6 is a schematic diagram of a basic structure of an electronic device according to an embodiment of the present application.

Reference is made to FIG. 6 below, which is a schematic diagram of a structure of an electronic device 600 suitable for implementing the embodiments of the present application. The terminal device in the embodiments of the present application may include, but is not limited to, mobile terminals such as a mobile phone, a notebook computer, a digital broadcast receiver, a personal digital assistant (PDA), a tablet computer (Portable Android Device, PAD), a portable multimedia player (PMP), and a vehicle-mounted terminal (such as a vehicle navigation terminal), and fixed terminals such as a digital television (TV) and a desktop computer. The electronic device shown in FIG. 6 is merely an example, and shall not impose any limitation on the function and scope of use of the embodiments of the present application.

As shown in FIG. 6, the electronic device 600 may include a processing apparatus (e.g., a central processing unit, a graphics processing unit, etc.) 601 that may perform a variety of appropriate actions and processing in accordance with a program stored in a read-only memory (ROM) 602 or a program loaded from a storage apparatus 608 into a random access memory (RAM) 603. The RAM 603 further stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touchpad, a keyboard, a mouse, a camera, a microphone, an accelerometer, and a gyroscope; an output apparatus 607 including, for example, a liquid crystal display (LCD), a speaker, and a vibrator; a storage apparatus 608 including, for example, a tape and a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all of the shown apparatuses. It may be an alternative to implement or have more or fewer apparatuses.

In particular, according to an embodiment of the present application, the process described above with reference to the flowchart may be implemented as a computer software program. For example, this embodiment of the present application includes a computer program product, which includes a computer program carried on a non-transitory computer-readable medium, where the computer program includes program code for performing the method shown in the flowchart. In such an embodiment, the computer program may be downloaded from a network through the communication apparatus 609 and installed, installed from the storage apparatus 608, or installed from the ROM 602. The computer program, when executed by the processing apparatus 601, causes the above-mentioned functions defined in the method according to the embodiments of the present application to be performed.

The electronic device provided in this embodiment of the present application and the method for detecting a scheduling deadlock in data query provided in the above embodiment belong to the same inventive concept. For the technical details not described in detail in this embodiment, reference can be made to the above embodiment, and this embodiment and the above embodiment have the same beneficial effects.

Based on the method for detecting a scheduling deadlock in data query provided in the above method embodiment, an embodiment of the present application provides a computer-readable medium having a computer program stored thereon. The program, when executed by a processor, causes the method for detecting a scheduling deadlock in data query according to any one of the above embodiments to be implemented.

It should be noted that the above computer-readable medium described in the present application may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present application, the computer-readable storage medium may be any tangible medium containing or storing a program which may be used by or in combination with an instruction execution system, apparatus, or device. In the present application, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, the client and the server may communicate using any currently known or future-developed network protocol such as a Hypertext Transfer Protocol (HTTP), and may be connected to digital data communication (for example, communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and the one or more programs, when executed by the electronic device, cause the electronic device to perform the above method for detecting a scheduling deadlock in data query.

The computer program code for performing the operations of the present application may be written in one or more programming languages or a combination thereof, where the programming languages include, but are not limited to, an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowchart and the block diagram in the accompanying drawings illustrate the possibly implemented architecture, functions, and operations of the system, method, and computer program product according to the embodiments of the present application. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present application may be implemented by software, or may be implemented by hardware. The name of a unit/module does not constitute a limitation on the unit itself in some cases. For example, a voice data collection module may alternatively be described as a "data collection module".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present application, a machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

It should be noted that the various embodiments in this specification are described in a progressive manner, and each embodiment focuses on the differences from other embodiments. The same or similar parts between the various embodiments may be referenced to each other. For the system or apparatus disclosed in this embodiment, since it corresponds to the method disclosed in the embodiments, the description is relatively simple, and for the related parts, reference may be made to the description of the method.

It should be understood that, in the present application, "at least one (item)" means one or more, and "a plurality of" means two or more. The term "and/or" is used to describe an association relationship between associated objects, and indicates that three relationships may exist, for example, A and/or B may indicate that: only A exists, only B exists, and both A and B exist, where A or B may be singular or plural. The character "/" generally indicates an "or" relationship between the associated objects. "At least one of the following" or similar expressions refers to any combination of these items, including any combination of single items or plural items. For example, at least one of a, b, or c may indicate: a, b, and c, "a and b", "a and c", "b and c", or "a and b and c", where a, b, or c may be singular or plural.

It should also be noted that, herein, relative terms such as "first" and "second" are only used to distinguish one entity or operation from another entity or operation, and do not necessarily require or imply that such an actual relationship or order exists between these entities or operations. Moreover, the terms "include" and "comprise", or any of their variants are intended to cover a non-exclusive inclusion, so that a process, method, article, or device that includes a list of elements not only includes those elements but also includes other elements that are not expressly listed, or further includes elements inherent to such process, method, article, or device. In the absence of more restrictions, an element defined by "including a . . . " does not exclude another identical element in a process, method, article, or device that includes the element.

The steps of the method or algorithm described in conjunction with the embodiments disclosed herein may be implemented directly in hardware, in a software module executed by a processor, or in a combination of the two. The software module may be disposed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

With respect to the above description of the disclosed embodiments, those skilled in the art could implement or use the present application. Various modifications to these embodiments are apparent to those skilled in the art, and the general principle defined herein may be practiced in other embodiments without departing from the spirit or scope of the present application. Therefore, the present application is not limited to the embodiments described herein but is to be accorded with the broadest scope consistent with the principle and novel features disclosed herein.

We claim:

1. A method for detecting a scheduling deadlock in data query, the method comprising:

obtaining a query statement, and generating a query plan tree corresponding to the query statement, the query plan tree comprising a plurality of operator nodes and a query logical relationship between the plurality of operator nodes, and the operator nodes comprising a common temporary table production operator node, a common temporary table consumption operator node, and a hash join operator node, the hash join operator node is used to join two common temporary tables;

traversing the query plan tree to determine at least one right table chain in the query plan tree, the right table chain comprising a leaf node and a root node that is not the hash join operator node in the query plan tree, wherein when a parent node of an operator node in the right table chain is the hash join operator node, the operator node is a right child node of its parent node, and the right table chain comprises the parent node of the operator node;

traversing the operator nodes in the right table chain from bottom to top starting from the leaf node in the right table chain, and traversing the other operator nodes in the query plan tree, to analyze an execution order relationship between the operator nodes traversed in the query plan tree, and searching for two identical common temporary table consumption operator nodes in the query plan tree that have a scheduling dependency relationship, the scheduling dependency relationship representing different execution orders of the two identical common temporary table consumption operator nodes; and determining that there is a scheduling deadlock when upstream operator nodes of the two identical common temporary table consumption operator nodes that have the scheduling dependency relationship are the same common temporary table production operator node.

2. The method according to claim 1, wherein the traversing the query plan tree to determine at least one right table chain in the query plan tree comprises:

assigning a first flag to a root node of the query plan tree;

traversing the operator nodes in the query plan tree from top to bottom starting from the root node, and in a case where the operator node traversed is the hash join operator node, assigning the first flag to a right child node of the hash join operator node, and assigning a second flag to a left child node of the hash join operator node; or in a case where the operator node traversed is not the hash join operator node, assigning a value of the operator node traversed to both the left child node and the right child node of the operator node, until reaching the leaf node of the query plan tree; and traversing the operator nodes with the first flag in the query plan tree from bottom to top starting from the leaf node with the first flag, until reaching an operator node with the second flag, and determining a chain formed by the operator nodes traversed as the right table chain in the query plan tree, wherein a number of right table chains in the query plan tree is equal to a number of leaf nodes with the first flag in the query plan tree.

3. The method according to claim 1, wherein the traversing the operator nodes in the right table chain from bottom to top starting from the leaf node in the right table chain, and traversing the other operator nodes in the query plan tree, to analyze an execution order relationship between the operator nodes traversed in the query plan tree comprises:

determining the leaf node in the right table chain as a node with the earliest execution order;

traversing the operator nodes in the right table chain from bottom to top starting from the leaf node in the right table chain, and determining an execution order relationship between the operator nodes in the right table chain according to order rules; and traversing the other operator nodes of the query plan tree, and determining an execution order relationship between the other operator nodes according to the order rules, wherein the order rules comprise one or more of the following:

when a downstream operator node is not the hash join operator node, determining that execution orders of an adjacent upstream operator node and the downstream operator node are the same; and when there is the hash join operator node, determining that an execution order of the hash join operator node is later than an execution order of a right child node of the hash join operator node, and is the same as an execution order of a left child node of the hash join operator node.

4. The method according to claim 1, wherein the traversing the operator nodes in the right table chain from bottom to top starting from the leaf node in the right table chain, and traversing the other operator nodes in the query plan tree, to analyzing an execution order relationship between the operator nodes traversed in the query plan tree, and searching for two identical common temporary table consumption operator nodes in the query plan tree that have a scheduling dependency relationship comprises:

traversing the operator nodes in the right table chain from bottom to top starting from the leaf node in the right table chain, traversing the other operator nodes of the query plan tree, and assigning order values to the operator nodes traversed, the order values being used to represent the execution order relationship between the operator nodes; and determining two identical common temporary table consumption operator nodes with different order values in the query plan tree as the two identical common temporary table consumption operator nodes in the query plan tree that have the scheduling dependency relationship.

5. The method according to claim 4, wherein the traversing the operator nodes in the right table chain from bottom to top starting from the leaf node in the right table chain, traversing the other operator nodes of the query plan tree, and assigning order values to the operator nodes traversed comprises:

assigning an order value to a leaf node in each right table chain;

determining an operator node traversed in the right table chain as a current node, and obtaining a parent node of the current node, the parent node of the current node being a parent node of the current node in the right table chain;

in a case where the parent node of the current node is not empty and is not the hash join operator node, assigning an order value of the current node to the parent node of the current node, determining the parent node of the current node as a next operator node to be traversed in the right table chain, and re-performing the step of determining an operator node traversed as a current node, and obtaining a parent node of the current node, and subsequent steps;

in a case where the parent node of the current node is not empty and is the hash join operator node, assigning the sum of the order value of the current node and a preset value to the parent node of the current node and a left child node of the parent node of the current node, using the left child node of the parent node of the current node as an object node to execute a left table chain determination logic thereon, and using the current node as the object node to execute the left table chain determination logic thereon; and determining the parent node of the current node as a next operator node to be traversed in the right table chain, and re-performing the step of determining an operator node traversed as a current node, and obtaining a parent node of the current node, and subsequent steps; or in a case where the current node is not the hash join operator node and the parent node of the current node is empty, using the current node as the object node to execute the left table chain determination logic thereon, wherein the left table chain determination logic is determining whether the object node is the hash join operator node; and if yes, assigning the order value of the object node to a left child node of the object node; or if no, assigning the order value of the object node to each child node of the object node; and determining a child node of the object node that is assigned the order value as the object node, and re-performing the step of determining whether the object node is a hash join operator node and subsequent steps, until the object node is a leaf node.

6. The method according to claim 1, wherein the common temporary table production operator node is used to generate the common temporary table to be transferred to the common temporary table consumption operator node for use; and the determining that there is a scheduling deadlock when upstream operator nodes of the two identical common temporary table consumption operator nodes that have the scheduling dependency relationship are the same common temporary table production operator node comprises:

determining that there is a scheduling deadlock when the upstream operator nodes of the two identical common temporary table consumption operator nodes that have the scheduling dependency relationship are the same common temporary table production operator node and the common temporary table does not meet a preset condition, wherein the preset condition is that a data amount of target data is less than a data amount threshold or an execution time of the common temporary table consumption operator node for the target data is less than a time threshold, and the target data is obtained from the common temporary table.

7. The method according to claim 1, further comprising:

when it is determined that there is a scheduling deadlock, obtaining a target common temporary table consumption operator node in the query plan tree that caches the target data, the target data being data that cannot be processed by a target hash join operator node due to the scheduling deadlock, and the target hash join operator being a parent node of the target common temporary table consumption operator node; and adding a cache operator between the target common temporary table consumption operator node and the target hash join operator node, to store the target data into a storage space corresponding to the cache operator.

8. An electronic device, comprising:

one or more processors; and a storage apparatus having one or more programs stored thereon, wherein the one or more programs, when executed by the one or more processors, cause the one or more processors to:

obtain a query statement, and generate a query plan tree corresponding to the query statement, the query plan tree comprising a plurality of operator nodes and a query logical relationship between the plurality of operator nodes, and the operator nodes comprising a common temporary table production operator node, a common temporary table consumption operator node, and a hash join operator node, the hash join operator node is used to join two common temporary tables;

traverse the query plan tree to determine at least one right table chain in the query plan tree, the right table chain comprising a leaf node and a root node that is not the hash join operator node in the query plan tree, wherein when a parent node of an operator node in the right table chain is the hash join operator node, the operator node is a right child node of its parent node, and the right table chain comprises the parent node of the operator node;

traverse the operator nodes in the right table chain from bottom to top starting from the leaf node in the right table chain, and traverse the other operator nodes in the query plan tree, to analyze an execution order relationship between the operator nodes traversed in the query plan tree, and search for two identical common temporary table consumption operator nodes in the query plan tree that have a scheduling dependency relationship, the scheduling dependency relationship representing different execution orders of the two identical common temporary table consumption operator nodes; and determine that there is a scheduling deadlock when upstream operator nodes of the two identical common temporary table consumption operator nodes that have the scheduling dependency relationship are the same common temporary table production operator node.

9. The electronic device according to claim 8, wherein the one or more processors are caused to traverse the query plan tree to determine at least one right table chain in the query plan tree by being caused to:

assign a first flag to a root node of the query plan tree;

traverse the operator nodes in the query plan tree from top to bottom starting from the root node, and in a case where the operator node traversed is the hash join operator node, assign the first flag to a right child node of the hash join operator node, and assign a second flag to a left child node of the hash join operator node; or in a case where the operator node traversed is not the hash join operator node, assign a value of the operator node traversed to both the left child node and the right child node of the operator node, until reaching the leaf node of the query plan tree; and traverse the operator nodes with the first flag in the query plan tree from bottom to top starting from the leaf node with the first flag, until reaching an operator node with the second flag, and determine a chain formed by the operator nodes traversed as the right table chain in the query plan tree, wherein a number of right table chains in the query plan tree is equal to a number of leaf nodes with the first flag in the query plan tree.

10. The electronic device according to claim 8, wherein the one or more processors are caused to traverse the operator nodes in the right table chain from bottom to top starting from the leaf node in the right table chain, and traverse the other operator nodes in the query plan tree, to analyze an execution order relationship between the operator nodes traversed in the query plan tree by being caused to:

determine the leaf node in the right table chain as a node with the earliest execution order;

traverse the operator nodes in the right table chain from bottom to top starting from the leaf node in the right table chain, and determine an execution order relationship between the operator nodes in the right table chain according to order rules; and traverse the other operator nodes of the query plan tree, and determine an execution order relationship between the other operator nodes according to the order rules, wherein the order rules comprise one or more of the following:

when a downstream operator node is not the hash join operator node, determining that execution orders of an adjacent upstream operator node and the downstream operator node are the same; and when there is the hash join operator node, determining that an execution order of the hash join operator node is later than an execution order of a right child node of the hash join operator node, and is the same as an execution order of a left child node of the hash join operator node.

11. The electronic device according to claim 8, wherein the one or more processors are caused to traverse the operator nodes in the right table chain from bottom to top starting from the leaf node in the right table chain, and traverse the other operator nodes in the query plan tree, to analyzing an execution order relationship between the operator nodes traversed in the query plan tree, and search for two identical common temporary table consumption operator nodes in the query plan tree that have a scheduling dependency relationship by being caused to:

traverse the operator nodes in the right table chain from bottom to top starting from the leaf node in the right table chain, traverse the other operator nodes of the query plan tree, and assign order values to the operator nodes traversed, the order values being used to represent the execution order relationship between the operator nodes; and determine two identical common temporary table consumption operator nodes with different order values in the query plan tree as the two identical common temporary table consumption operator nodes in the query plan tree that have the scheduling dependency relationship.

12. The electronic device according to claim 11, wherein the one or more processors are caused to traverse the operator nodes in the right table chain from bottom to top starting from the leaf node in the right table chain, traverse the other operator nodes of the query plan tree, and assign order values to the operator nodes traversed by being caused to:

assign an order value to a leaf node in each right table chain;

determine an operator node traversed in the right table chain as a current node, and obtain a parent node of the current node, the parent node of the current node being a parent node of the current node in the right table chain;

in a case where the parent node of the current node is not empty and is not the hash join operator node, assign an order value of the current node to the parent node of the current node, determine the parent node of the current node as a next operator node to be traversed in the right table chain, and re-perform the step of determining an operator node traversed as a current node, and obtaining a parent node of the current node, and subsequent steps;

in a case where the parent node of the current node is not empty and is the hash join operator node, assign the sum of the order value of the current node and a preset value to the parent node of the current node and a left child node of the parent node of the current node, use the left child node of the parent node of the current node as an object node to execute a left table chain determination logic thereon, and use the current node as the object node to execute the left table chain determination logic thereon; and determine the parent node of the current node as a next operator node to be traversed in the right table chain, and re-perform the step of determine an operator node traversed as a current node, and obtain a parent node of the current node, and subsequent steps; or in a case where the current node is not the hash join operator node and the parent node of the current node is empty, use the current node as the object node to execute the left table chain determination logic thereon, wherein the left table chain determination logic is determining whether the object node is the hash join operator node; and if yes, assign the order value of the object node to a left child node of the object node; or if no, assign the order value of the object node to each child node of the object node; and determine a child node of the object node that is assigned the order value as the object node, and re-perform the step of determining whether the object node is a hash join operator node and subsequent steps, until the object node is a leaf node.

13. The electronic device according to claim 8, wherein the common temporary table production operator node is used to generate the common temporary table to be transferred to the common temporary table consumption operator node for use; and the one or more processors are caused to determine that there is a scheduling deadlock when upstream operator nodes of the two identical common temporary table consumption operator nodes that have the scheduling dependency relationship are the same common temporary table production operator node by being caused to:

determine that there is a scheduling deadlock when the upstream operator nodes of the two identical common temporary table consumption operator nodes that have the scheduling dependency relationship are the same common temporary table production operator node and the common temporary table does not meet a preset condition, wherein the preset condition is that a data amount of target data is less than a data amount threshold or an execution time of the common temporary table consumption operator node for the target data is less than a time threshold, and the target data is obtained from the common temporary table.

14. The electronic device according to claim 8, wherein the one or more processors are further caused to:

when it is determined that there is a scheduling deadlock, obtain a target common temporary table consumption operator node in the query plan tree that caches the target data, the target data being data that cannot be processed by a target hash join operator node due to the scheduling deadlock, and the target hash join operator being a parent node of the target common temporary table consumption operator node; and add a cache operator between the target common temporary table consumption operator node and the target hash join operator node, to store the target data into a storage space corresponding to the cache operator.

15. A non-transitory computer-readable storage medium, having stored thereon a computer program that, when executed by a processor, implements:

obtaining a query statement, and generating a query plan tree corresponding to the query statement, the query plan tree comprising a plurality of operator nodes and a query logical relationship between the plurality of operator nodes, and the operator nodes comprising a common temporary table production operator node, a common temporary table consumption operator node, and a hash join operator node, the hash join operator node is used to join two common temporary tables;

traversing the query plan tree to determine at least one right table chain in the query plan tree, the right table chain comprising a leaf node and a root node that is not the hash join operator node in the query plan tree, wherein when a parent node of an operator node in the right table chain is the hash join operator node, the operator node is a right child node of its parent node, and the right table chain comprises the parent node of the operator node;

traversing the operator nodes in the right table chain from bottom to top starting from the leaf node in the right table chain, and traversing the other operator nodes in the query plan tree, to analyze an execution order relationship between the operator nodes traversed in the query plan tree, and searching for two identical common temporary table consumption operator nodes in the query plan tree that have a scheduling dependency relationship, the scheduling dependency relationship representing different execution orders of the two identical common temporary table consumption operator nodes; and determining that there is a scheduling deadlock when upstream operator nodes of the two identical common temporary table consumption operator nodes that have the scheduling dependency relationship are the same common temporary table production operator node.

16. The non-transitory computer-readable storage medium according to claim 15, wherein the traversing the query plan tree to determine at least one right table chain in the query plan tree comprises:

assigning a first flag to a root node of the query plan tree;

traversing the operator nodes in the query plan tree from top to bottom starting from the root node, and in a case where the operator node traversed is the hash join operator node, assigning the first flag to a right child node of the hash join operator node, and assigning a second flag to a left child node of the hash join operator node; or in a case where the operator node traversed is not the hash join operator node, assigning a value of the operator node traversed to both the left child node and the right child node of the operator node, until reaching the leaf node of the query plan tree; and traversing the operator nodes with the first flag in the query plan tree from bottom to top starting from the leaf node with the first flag, until reaching an operator node with the second flag, and determining a chain formed by the operator nodes traversed as the right table chain in the query plan tree, wherein a number of right table chains in the query plan tree is equal to a number of leaf nodes with the first flag in the query plan tree.

17. The non-transitory computer-readable storage medium according to claim 15, wherein the traversing the operator nodes in the right table chain from bottom to top starting from the leaf node in the right table chain, and traversing the other operator nodes in the query plan tree, to analyze an execution order relationship between the operator nodes traversed in the query plan tree comprises:

determining the leaf node in the right table chain as a node with the earliest execution order;

traversing the operator nodes in the right table chain from bottom to top starting from the leaf node in the right table chain, and determining an execution order relationship between the operator nodes in the right table chain according to order rules; and traversing the other operator nodes of the query plan tree, and determining an execution order relationship between the other operator nodes according to the order rules, wherein the order rules comprise one or more of the following:

when a downstream operator node is not the hash join operator node, determining that execution orders of an adjacent upstream operator node and the downstream operator node are the same; and when there is the hash join operator node, determining that an execution order of the hash join operator node is later than an execution order of a right child node of the hash join operator node, and is the same as an execution order of a left child node of the hash join operator node.

18. The non-transitory computer-readable storage medium according to claim 15, wherein the traversing the operator nodes in the right table chain from bottom to top starting from the leaf node in the right table chain, and traversing the other operator nodes in the query plan tree, to analyzing an execution order relationship between the operator nodes traversed in the query plan tree, and searching for two identical common temporary table consumption operator nodes in the query plan tree that have a scheduling dependency relationship comprises:

traversing the operator nodes in the right table chain from bottom to top starting from the leaf node in the right table chain, traversing the other operator nodes of the query plan tree, and assigning order values to the operator nodes traversed, the order values being used to represent the execution order relationship between the operator nodes; and determining two identical common temporary table consumption operator nodes with different order values in the query plan tree as the two identical common temporary table consumption operator nodes in the query plan tree that have the scheduling dependency relationship.

19. The non-transitory computer-readable storage medium according to claim 18, wherein the traversing the operator nodes in the right table chain from bottom to top starting from the leaf node in the right table chain, traversing the other operator nodes of the query plan tree, and assigning order values to the operator nodes traversed comprises:

assigning an order value to a leaf node in each right table chain;

determining an operator node traversed in the right table chain as a current node, and obtaining a parent node of the current node, the parent node of the current node being a parent node of the current node in the right table chain;

in a case where the parent node of the current node is not empty and is not the hash join operator node, assigning an order value of the current node to the parent node of the current node, determining the parent node of the current node as a next operator node to be traversed in the right table chain, and re-performing the step of determining an operator node traversed as a current node, and obtaining a parent node of the current node, and subsequent steps;

in a case where the parent node of the current node is not empty and is the hash join operator node, assigning the sum of the order value of the current node and a preset value to the parent node of the current node and a left child node of the parent node of the current node, using the left child node of the parent node of the current node as an object node to execute a left table chain determination logic thereon, and using the current node as the object node to execute the left table chain determination logic thereon; and determining the parent node of the current node as a next operator node to be traversed in the right table chain, and re-performing the step of determining an operator node traversed as a current node, and obtaining a parent node of the current node, and subsequent steps; or in a case where the current node is not the hash join operator node and the parent node of the current node is empty, using the current node as the object node to execute the left table chain determination logic thereon, wherein the left table chain determination logic is determining whether the object node is the hash join operator node; and if yes, assigning the order value of the object node to a left child node of the object node; or if no, assigning the order value of the object node to each child node of the object node; and determining a child node of the object node that is assigned the order value as the object node, and re-performing the step of determining whether the object node is a hash join operator node and subsequent steps, until the object node is a leaf node.

20. The non-transitory computer-readable storage medium according to claim 15, wherein the common temporary table production operator node is used to generate the common temporary table to be transferred to the common temporary table consumption operator node for use; and the determining that there is a scheduling deadlock when upstream operator nodes of the two identical common temporary table consumption operator nodes that have the scheduling dependency relationship are the same common temporary table production operator node comprises:

determining that there is a scheduling deadlock when the upstream operator nodes of the two identical common temporary table consumption operator nodes that have the scheduling dependency relationship are the same common temporary table production operator node and the common temporary table does not meet a preset condition, wherein the preset condition is that a data amount of target data is less than a data amount threshold or an execution time of the common temporary table consumption operator node for the target data is less than a time threshold, and the target data is obtained from the common temporary table.

* * * * *